United States Patent
Takada et al.

(10) Patent No.: US 6,517,955 B1
(45) Date of Patent: Feb. 11, 2003

(54) HIGH STRENGTH GALVANIZED STEEL PLATE EXCELLENT IN ADHESION OF PLATED METAL AND FORMABILITY IN PRESS WORKING AND HIGH STRENGTH ALLOY GALVANIZED STEEL PLATE AND METHOD FOR PRODUCTION THEREOF

(75) Inventors: Yoshihisa Takada, Kitakyushu (JP); Masayoshi Suehiro, Kitakyushu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/720,774

(22) PCT Filed: Dec. 2, 1999

(86) PCT No.: PCT/JP99/06774
§ 371 (c)(1),
(2), (4) Date: Dec. 29, 2000

(87) PCT Pub. No.: WO00/50658
PCT Pub. Date: Aug. 31, 2000

(30) Foreign Application Priority Data

Feb. 22, 1999 (JP) .................................. 11-043319
May 21, 1999 (JP) .................................. 11-141423
Jul. 30, 1999 (JP) .................................. 11-217987

(51) Int. Cl.$^7$ .............................. B32B 15/18; C21D 9/46
(52) U.S. Cl. ................. 428/659; 148/522; 148/533; 148/534; 148/540; 148/546; 148/547; 148/621; 148/648; 148/650; 148/651; 148/653; 148/654; 148/661; 427/372.2; 427/374.1; 427/383.7; 427/433; 427/436; 428/681; 428/939
(58) Field of Search .................. 428/659, 681, 428/939; 427/372.2, 374.1, 383.7, 433, 436; 148/522, 533, 534, 540, 546, 547, 621, 648, 650, 651, 653, 654, 661

(56) References Cited

U.S. PATENT DOCUMENTS 6,306,527 B1 * 10/2001 Ikeda et al. .................. 428/659

FOREIGN PATENT DOCUMENTS

| JP | 1-79345 | 3/1989 |
| JP | 1-230715 | 9/1989 |
| JP | 2-217425 | 8/1990 |
| JP | 4-333552 | 11/1992 |
| JP | 4-346644 | 12/1992 |
| JP | 5-70886 | 3/1993 |
| JP | 5-247586 | 9/1993 |
| JP | 6-145788 | 5/1994 |
| JP | 8-199288 | 8/1996 |
| JP | 9-13147 | 1/1997 |

* cited by examiner

*Primary Examiner*—Robert R. Koehler
(74) *Attorney, Agent, or Firm*—Kenyon & Kenyon

(57) ABSTRACT

The invention relates to a high strength hot-dip galvanized and galvannealed steel sheets with excellent drawability for press forming and excellent plating adhesion that is useful as a member for automobiles, construction, electric devices and the like, and to a process for its manufacture. According to an embodiment of the invention, the steel sheet contains in terms of weight percent, C: 0.05–0.2%, Si: 0.2–2.0%, Mn: 0.2–2.5%, Al: 0.01–1.5%, Ni: 0.2–5.0%, P: <0.03% and S: <0.02%, the relationship between Si and Al being such that $0.4(\%) \leq Si+0.8 \, Al(\%) \leq 2.0\%$ and the remainder consisting of Fe and unavoidable impurities, the volume percentage of the retained austenite is 2–20% and the steel sheet surface wherein the relationship between the Ni and Si, Al in 0.5 μm of the steel sheet surface layer is such that $Ni(\%) \leq \frac{1}{4} Si + \frac{1}{3} Al(\%)$, has a Zn plating layer comprising Al: $\leq 1\%$ with the remainder Zn and unavoidable impurities.

15 Claims, 1 Drawing Sheet

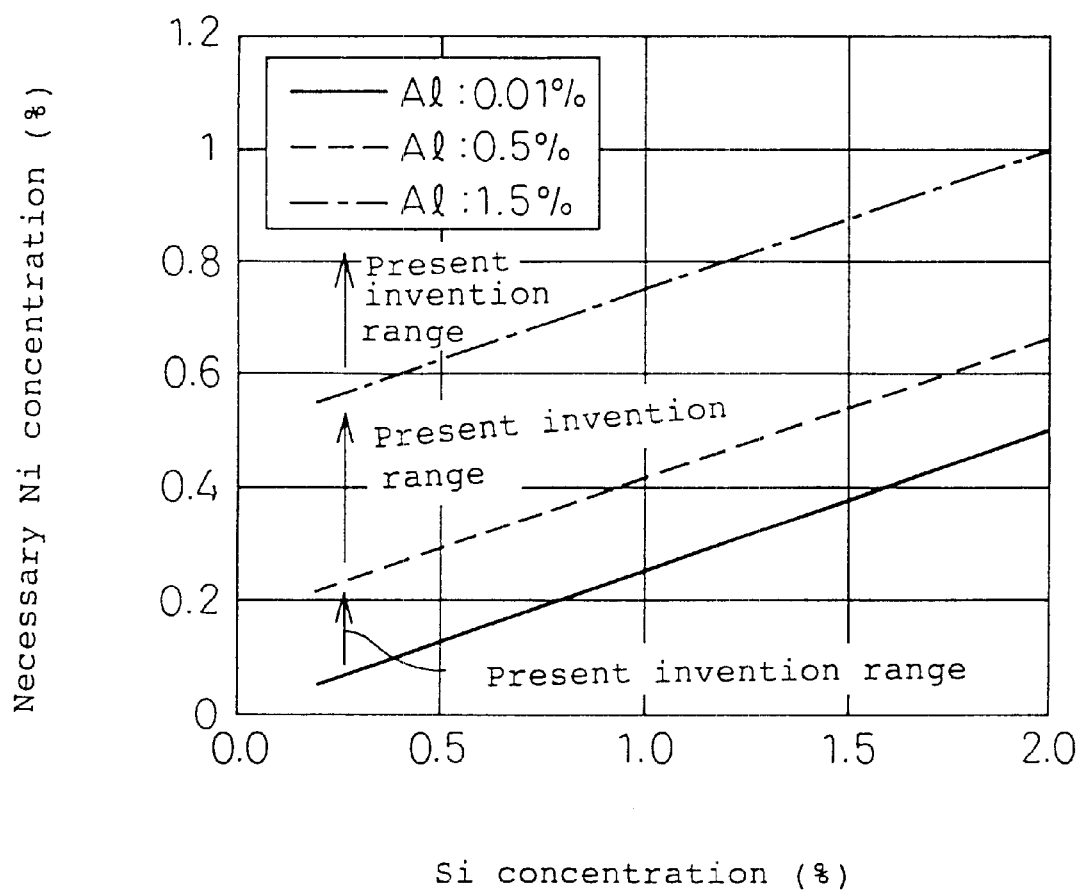

HIGH STRENGTH GALVANIZED STEEL PLATE EXCELLENT IN ADHESION OF PLATED METAL AND FORMABILITY IN PRESS WORKING AND HIGH STRENGTH ALLOY GALVANIZED STEEL PLATE AND METHOD FOR PRODUCTION THEREOF

TECHNICAL FIELD

The present invention relates to a high strength steel sheet that is useful as a member for automobiles, construction, electric devices and the like and to a process for its manufacture, and more particularly it relates to a high strength hot-dip galvanized steel sheet with excellent draw ability properties for press forming and excellent plating adhesion, to a hot-dip galvannealed plated steel sheet, and to a process for its manufacture.

BACKGROUND ART

A current area of research on members such as cross members and side members of automobiles and the like is directed toward achieving lighter weight for the purpose of realizing lower fuel consumption and, in the area of materials, progress is being made in achieving higher strength in a manner that guarantees strength while producing thinner products. However, since the press formability of most materials is inferior with increasing strength, achieving such lighter weight members requires the development of steel sheets that exhibit both satisfactory press formability and high strength properties. The index values for formability include the elongation as well as the n value and r value obtained in tensile testing, and in the current situation, where one of the targets is to simplify the pressing steps through greater integration, it is important for the n value to be large, thus corresponding to uniform elongation.

For this purpose, there have been developed hot rolled steel sheets and cold rolled steel sheets that take advantage of the transformation-induced plasticity of the retained austenite in steel. These are steel sheets consisting of about 0.07–0.4% C, about 0.3–2.0% Si and about 0.2–2.5% Mn as the basic alloy elements, without any expensive alloy elements, and containing retained austenite in the microstructure by heat treatment characterized by accomplishing bainite transformation at an inner and outer temperature of 300–450° C. after annealing in the two-phase region; such steel sheets are disclosed, for example, in Japanese Unexamined Patent Publication No. 1-230715 and No. 2-217425. Such steel sheets are disclosed not only as cold rolled steel sheets manufactured by continuous annealing, but also as hot rolled steel sheets obtained by controlling the cooling and coiling temperature with a runout table, as in Japanese Unexamined Patent Publication No. 1-79345, for example.

The plating of automobile members is advancing for the purpose of improving corrosion resistance and outer appearance to reflect higher quality in automobiles, and at the current time galvanized or galvannealed steel sheets are used for most members other than special internally-mounted members. From the standpoint of corrosion resistance, therefore, it is effective to coat such steel sheets with Zn or Fe-Zn, however, since high strength steel with a high Si content also has an oxidation film on the steel sheet surface, it presents a problem in that minute unplated regions result upon hot-dip galvanizing, and in that the plating adhesion of worked regions after alloying is inferior; at the current time, however, it has not been possible to realize galvannealed steel sheets with excellent plating adhesion at worked regions, excellent corrosion resistance and high strength and high ductility.

For example, since the steel sheets disclosed in Japanese Unexamined Patent Publication No. 1-230715 or No. 2-217425 contain 0.3–2.0% added Si and take advantage of its unique bainite transformation to guarantee retained austenite, unless rather strict control is kept on the cooling after annealing in the two-phase temperature range, and the holding at an internal temperature of 300–450° C., it is impossible to obtain the intended microstructure and the resulting strength and elongation are outside of the target ranges. While such a thermal history can be realized industrially with continuous annealing equipment and during the cooling step with the runout table after hot rolling, the austenite transformation is completed rapidly at 450–600° C. and therefore control is required for a particularly short holding time at 450–600° C. Even at 350–450° C., the microstructure varies considerably depending on the holding time, and any shift from the desired conditions results in only an low level of strength and elongation. For hot-dip galvanizing the holding time at 450–600° C. is usually long, and therefore this technique cannot be applied. Furthermore, there is a problem in that the inclusion of Si as the alloy element results in poorer plating, and this impedes passage through the hot-dip galvanizing equipment to make a plated steel sheet.

In order to solve these problems, there have been disclosed steel sheets with improved plating properties through restriction of the Si concentration, for example, in Japanese Unexamined Patent Publication No. 5-247586 and Japanese Unexamined Patent Publication No. 6-145788. According to such processes, Al is added instead of Si to produce retained austenite. However, since Al like Si is also more easily oxidized than Fe, the Al and Si tend to concentrate on the steel sheet surface as an oxidized film, making it impossible to achieve adequate plating adhesion. Another process disclosed in Japanese Unexamined Patent Publication No. 5-70886 adds Ni to improve the plating wettability. For this process, however, it is not disclosed what relationship between the Si or Al and Ni is necessary to inhibit the plating wettability.

Furthermore, Japanese Unexamined Patent Publication No. 4-333552 and No. 4-346644 disclose processes whereby rapid low temperature heating is conducted after Ni pre-plating for alloying treatment after hot-dip Zn plating, as processes for hot-dip galvannealing of high Si high strength steel sheets. However, since these processes require Ni pre-plating, the problem of requiring new equipment arises. These processes also do not allow retention of retained austenite in the final microstructure, nor is any such mention made for this process.

The present invention solves the aforementioned problems and represents the discovery of the features of the composition and microstructure of a high strength steel sheet with improved surface corrosion resistance and excellent plating adhesion allowing its manufacture with hot-dip galvanizing equipment, as well as satisfactory press formability.

DISCLOSURE OF THE INVENTION

It is an object of the present invention to provide a high strength hot-dip galvannealed steel sheet with satisfactory press formability and plating adhesion and a process for efficient manufacture of the steel sheet.

The present inventors have carried out diligent research on plating properties and steel sheet components in order to provide a high strength hot-dip galvannealed steel sheet and a process for its manufacture, and have completed the present invention by concentrating on the steel sheet surface layer, to arrive at the gist of the invention as described below.

(1) A high strength hot-dip galvannealed steel sheet with excellent plating adhesion and press formability, the steel sheet containing, in terms of weight percent, C: 0.05–0.2%,
Si: 0.2–2.0%,
Mn: 0.2–2.5%,
Al: 0.01–1.5%,
Ni: 0.2–5.0%,
P: <0.03% and
S: <0.02% where the relationship between Si and Al is such that $0.4(\%) \leq Si+0.8 \, Al(\%) \leq 2.0\%$ and the remainder consists of Fe and unavoidable impurities, characterized in that the volume percentage of the retained austenite in the steel sheet is 2–20%, and the steel sheet surface wherein the relationship between the Ni and Si, Al in 0.5 μm of the steel sheet surface layer is such that $Ni(\%) \geq \frac{1}{4} Si + \frac{1}{3} Al(\%)$ has a Zn plating layer comprising Al: $\leq 1\%$ with the remainder Zn and unavoidable impurities.

(2) A high strength hot-dip galvanized steel sheet with excellent plating adhesion and press formability, characterized by also containing, in addition to the steel sheet components mentioned in (1) above, in terms of weight percent, Cu at less than 2.0%, wherein the volume percentage of the retained austenite in the steel sheet is 2–20%, and the relationship between the Ni, Cu and Si, Al in 0.5 μm of the steel sheet surface layer is such that $Ni+Cu(\%) \geq \frac{1}{4} Si + \frac{1}{3} Al(\%)$.

(3) A high strength hot-dip galvanized steel sheet with excellent plating adhesion and press formability, characterized by also containing, in addition to the steel sheet components mentioned in (2) above in terms of weight percent, B at 0.0002–0.01%, wherein the relationship of Cu and B is such that $B \times Cu(\%) \geq 0.00005(\%)$.

(4) A high strength hot-dip galvanized steel sheet with excellent plating adhesion and press formability, characterized by also containing, in addition to the steel sheet components mentioned in any of (1) to (3) above in terms of weight percent, at least one from among Co at <0.3% and Sn at <0.3%, wherein the volume percentage of the retained austenite in the steel sheet is 2–20% and the relationship between the Ni, Cu, Co, Sn and Si, Al in 0.5 μm of the steel sheet surface layer is such that $Ni+Cu+Co+Sn(\%) \geq \frac{1}{4} Si + \frac{1}{3} Al(\%)$.

(5) A high strength hot-dip galvanized steel sheet with excellent plating adhesion and press formability, characterized by also containing, in addition to the steel sheet components mentioned in any of (1) to (4) above in terms of weight percent, at least one from among Mo: <0.5%, Cr: <1%, V: <0.3%, Ti: <0.06%, Nb: <0.06%, REM: <0.05%, Ca: <0.05%, Zr: <0.05%, Mg: <0.05%, Zn: <0.02%, W: <0.05%, As: <0.02%, N: <0.03% and O: <0.05%.

(6) A high strength hot-dip galvanized steel sheet with excellent plating adhesion and press formability, characterized in that the steel sheet surface of any of (1) to (5) above has a Zn plating layer containing at least one from among Al: $\leq 1\%$, Mn: <0.02%, Pb: <0.01%, Fe: <0.2%, Sb: <0.01%, Ni: <3.0%, Cu: <1.5%, Sn: <0.1%, Co: <0.1%, Cd: <0.01% and Cr: <0.05%, with the remainder Zn and unavoidable impurities.

(7) A high strength hot-dip galvannealed steel sheet with excellent press formability, characterized in that a steel sheet containing in terms of weight percent, C: 0.05–0.2%,
Si: 0.2–2.0%,
Mn: 0.2–2.5%,
Al: 0.01–1.5%,
Ni: 0.2–5.0%,
P: <0.03% and
S: <0.02%, where the relationship between Si and Al is such that $0.4(\%) \leq Si+0.8 \, Al(\%) \leq 2.0\%$, the remainder consists of Fe and unavoidable impurities, the volume percentage of the retained austenite in the steel sheet is 2–20% and the relationship between the Ni and Si, Al in 0.5 μm of the steel sheet surface layer is such that $Ni(\%) \geq \frac{1}{4} Si + \frac{1}{3} Al(\%)$, has a Zn alloy plating layer comprising Fe: 8–15%, Al: $\leq 1\%$ with the remainder Zn and unavoidable impurities.

(8) A high strength hot-dip galvannealed steel sheet with excellent press formability, characterized in that a steel sheet also containing, in addition to the steel sheet components mentioned in (6) above in terms of weight percent, Cu at less than 2.0% with the remainder Fe and unavoidable impurities, wherein the volume percentage of the retained austenite in the steel sheet is 2–20% and the relationship between the Ni, Cu and Si, Al in 0.5 μm of the steel sheet surface layer is such that $Ni+Cu(\%) \geq \frac{1}{4} Si + \frac{1}{3} Al(\%)$, has a Zn alloy plating layer comprising Fe at 8–15% and Al at $\leq 1\%$ with the remainder Zn and unavoidable impurities.

(9) A high strength hot-dip galvannealed steel sheet with excellent press formability, characterized in that a steel sheet also containing, in addition to the steel sheet components mentioned in (7) above in terms of weight percent, B at 0.0002–0.01% where the relationship between Cu and B is such that $B \times Cu(\%) \geq 0.00005(\%)$ with the remainder Fe and unavoidable impurities, has a Zn alloy plating layer comprising Fe at 8–15% and Al at $\leq 1\%$ with the remainder Zn and unavoidable impurities.

(10) A high strength hot-dip galvannealed steel sheet with excellent press formability, characterized in that a steel sheet also containing, in addition to the steel sheet components mentioned in any of (7) to (9) above in terms of weight percent, at least one from among Co at <0.3% and Sn at $\leq 0.3\%$ with the remainder Fe and unavoidable impurities, wherein the volume percentage of the retained austenite in the steel sheet is 2–20% and the relationship between the Ni, CU, Co, Sn and Si, Al in 0.5 μm of the steel sheet surface layer is such that $Ni+Cu+Co+Sn(\%) \geq \frac{1}{4} Si + \frac{1}{3} Al(\%)$, has a Zn alloy plating layer comprising Fe at 8–15% and Al at $\leq 1\%$ with the remainder Zn and unavoidable impurities.

(11) A high strength hot-dip galvannealed steel sheet with excellent press formability, characterized by also containing, in addition to the steel sheet components mentioned in any of (7) to (10) above in terms of weight percent, at least one from among Mo: <0.5%, Cr: <1%, V: <0.3%, Ti: <0.06%, Nb: <0.06%, REM: <0.05%, Ca: <0.05%, Zr: <0.05%, Mg: <0.05%, Zn: <0.02%, W: <0.05%, As: <0.02%, N: <0.03% and O: <0.05%.

(12) A high strength hot-dip galvannealed steel sheet with excellent plating adhesion and press formability, characterized in that the steel sheet surface of any of (7) to (11) above has a Zn plating layer containing at least one from among Fe: 8–15%, Al: $\leq 1\%$, Mn: <0.02%, Pb: <0.01%, Sb: <0.01%, Ni: <3.0%, Cu: <1.5%, Sn: <0.1%, Co: <0.1%, Cd: <0.01% and Cr: <0.05%, with the remainder Zn and unavoidable impurities.

(13) A process for manufacture of a high strength hot-dip galvanized steel sheet with excellent plating adhesion and press formability characterized by having 2–20% retained austenite and a Zn plating layer comprising Al at $\leq 1\%$ with the remainder Zn and unavoidable impurities, whereby a steel sheet having the components of any one of (1) to (6)

above is cast and solidified and then heated at 1150° or higher for at least 45 minutes, after which it is subjected to hot rolling and coiling at 400–780° C., and then after descaling treatment is subjected to cold rolling at a 35–85% draft, subsequently annealed from 10 seconds to 6 minutes in the two-phase temperature range of 650–900° C., and finally cooled to 350–500° C. at a cooling rate of 2–200° C./s, subjected to hot-dip zinc plating and then cooled to below 250° C. at a cooling rate of at least 5° C./s.

(14) A process for manufacture of a high strength hot-dip galvannealed steel sheet with excellent press formability characterized by having 2–20% retained austenite and a Zn alloy plating layer comprising Fe at 8–15% and Al at ≦1% with the remainder Zn and unavoidable impurities, whereby a steel sheet having the components of any one of (7) to (12) above is cast and solidified and then heated at 1150° or higher for at least 45 minutes, after which it is subjected to hot rolling and coiling at 400–780° C., and then after descaling treatment is subjected to cold rolling at a reduction ratio of 35–85%, subsequently annealed from 10 seconds to 6 minutes in the two-phase temperature range of 650–900° C., and finally cooled to 350–500° C. at a cooling rate of 2–200° C./s, and held in a temperature range of 450–600° C. for 5 seconds to 1 minute prior to cooling to below 250° C. at a cooling rate of at least 5° C./s.

(15) A process for manufacture of a high strength hot-dip galvannealed steel sheet with excellent press formability according to (13) or (14) above, characterized in that the cold rolling is followed by annealing from 10 seconds to 6 minutes in the two-phase temperature range of 650–900° C. and then by cooling to 350–500° C. at a cooling rate of 2–200 ° C./s and held in that temperature range for no more than 5 minutes.

BRIEF DESCRIPTION OF DRAWING

FIG. 1 shows a relationship between the necessary Ni concentration (%) and the Si concentration (%).

BEST MODE FOR CARRYING OUT THE INVENTION

The reason for the limits to the components of the present invention is to provide a high strength hot-dip galvannealed steel sheet with satisfactory press formability and plating adhesion, and this will now be explained in detail.

C is an austenite-stabilizing element, and it migrates from ferrite to austenite in the two-phase temperature range and the bainite transformation temperature range. As a result, the chemically stabilized austenite remains at 2–20% even after cooling to room temperature, giving satisfactory formability by transformation-induced plasticity. If C is present at less than 0.05% it is difficult to guarantee retained austenite of at least 2%, and the desired object cannot be achieved. The C concentration must not exceed 0.2% in order to avoid poor weldability.

Si does not dissolve in cementite and therefore delays the transformation from austenite to cementite at 350–600° C. because its controlling process is the diffusion of Si which is very slow at the temperature. The chemical stability of austenite increases during this time because of accelerated C concentration in the austenite, causing transformation-induced plasticity and making it possible to guarantee retained austenite to contribute to satisfactory formability. If the amount of Si is less than 0.2% this effect cannot be achieved. On the other hand, it must be no greater than 2.0% because, if the Si concentration is any higher, the plating properties are impaired.

Mn is an austenite-stabilizing element, and since it retards decomposition of austenite to perlite during the cooling to 350–600° C. after annealing in the two-phase temperature range, it promotes inclusion of retained austenite in the microstructure during surface cooling to room temperature. If added at less than 0.2% it becomes necessary to increase the cooling rate to a level at which industrial control is no longer possible in order to inhibit decomposition to perlite, and such a situation is unacceptable. On the other hand, it is preferably not greater than 2.5% because the band structure will become more notable and impair the properties, while the spot welded sections will tend to fracture within nuggets.

Al is used as a deoxidizing material because, like Si, it does not dissolve in cementite and therefore delays the ongoing transformation by inhibiting precipitation of cementite when held at 350–600° C. However, since its ferrite-forming ability is stronger than Si and it therefore accelerates transformation to ferrite, so that C is concentrated in the austenite from the moment of annealing in the two-phase temperature range even for a very short time, thus increasing the chemical stability, only a trace amount of formability-impairing martensite is present in the microstructure after cooling to room temperature. When copresent with Si, therefore, little change occurs in the strength or elongation depending on the holding conditions at 350–600° C., and it is therefore easy to achieve satisfactory press formability with high strength. The Al must therefore be added to at least 0.01%. Together with Si, "Si+0.8Al" must be at least 0.4%. On the other hand, as is the case with Si, the Al concentration must not exceed 1.5% to avoid impairing the plating adhesion. In order to guarantee plating adhesion together with Si, "Si+0.8Al" must be no greater than 2.0%.

Ni is the most important element according to the invention, and like Mn it is an austenite-stabilizing element and it also improves the strength and plating adhesion. In addition, like Si and Al, Ni also does not dissolve in cementite and therefore delays the ongoing transformation by inhibiting precipitation of cementite when held at 350–600° C. In a steel sheet containing Si or Al, when producing a plated steel sheet in a continuous hot-dip galvanizing line, Si and Al are more easily oxidized than Fe and are thus concentrated on the steel sheet surface, forming Si or Al oxides and reducing the plating adhesion. The inventors therefore attempted to prevent this reduction in plating adhesion despite the surface concentration of Si or Al, by allowing Ni to concentrate on the surface instead since it is more resistant to oxidation than Fe. By experimentation it was determined that a 0.5 $\mu$m section of the steel sheet surface reacts with the Zn layer during the plating reaction. In order to improve the plating adhesion, therefore, it is sufficient to control the surface concentrated layer of a 0.5 $\mu$m section of the steel sheet surface. If the Ni is present at 0.2% or less, it is not possible to achieve satisfactory plating adhesion with steel according to the invention. If the Ni concentration is 5% or higher the retained austenite exceeds 20% such that the elongation falls below the range of the invention. As a result of experimentation it has been found that satisfactory plating adhesion can only be obtained if the Ni concentration, together with Si and Al in 0.5 $\mu$m of the steel sheet surface, is at least such that "Ni(%) ≧¼ Si+⅓ Al(%)". This is illustrated in FIG. 1.

P is an element unavoidably included in steel as an impurity, and like Si, Al and Ni it does not dissolve in cementite and therefore delays the ongoing transformation by inhibiting precipitation of cementite when held at 350–600° C. However, since a P concentration exceeding 0.03% notably impairs the ductility of the steel sheet while also undesirably tending to result in fracture of spot welded sections within nuggets, the P concentration is limited to less than 0.03% according to the invention.

S, like P, is also an element unavoidably included in steel. A high S concentration may result in MnS precipitation leading to lower ductility while also undesirably tending to result in fracture of spot welded sections within nuggets, and therefore the S concentration is less than 0.02% according to the invention.

Cu, which, like Ni, is more resistant to oxidation than Fe, is an austenite-stabilizing element like Ni and Mn that also improves the strength and plating adhesion. Satisfactory plating adhesion can be achieved if the Ni and Cu concentration in 0.5 μm of the steel sheet surface layer, together with Si and Al, is such that "Ni+Cu(%) ≧¼ Si+⅓ Al(%)". A Cu concentration of 2.0% or higher may produce Cu precipitates, thus impairing the material quality and impeding the object of the invention. From the standpoint of preventing heat fracture by Cu when Cu is added, the relationship is preferably "Cu(%) <3×Ni(%)".

B is copresent with Cu and lowers the transformation point to inhibit precipitation of cementite and increase the volume percentage of retained austenite by delaying the progress of transformation. An adequate effect cannot be achieved if the B concentration is 0.0002% or lower. The upper limit for B is specified based on the concentration at which economy is affected, and this upper limit is set to 0.01%. In order to exhibit the effect of B and Cu together, B and Cu must be in a relationship that satisfies the inequality B×Cu(%) ≧0.00005(%). To exhibit a more powerful effect, the relationship is preferably B×Cu(%) ≧0.00008 (%).

The plating adhesion can also be improved by further adding another species similar to Ni and Cu that is more resistant to oxidation than Fe, such as Sn or Co. Satisfactory plating adhesion can be achieved if the Ni, Cu, Sn and Co concentration in 0.5 μm of the steel sheet surface, together with Si and Al, is at least such that "Ni+Cu(%) ≧¼ Si+⅓ Al(%)". A higher Sn concentration results in Sn-based heat fracture, and it is therefore limited to less than 0.3%. Co is an expensive metal and its upper limit is therefore 0.3%.

Mo, Cr, V, Ti, Nb, B, W, O, Zn and As are elements that increase the strength, while REM, Ca, Zr and Mg are elements that guarantee satisfactory elongation by combining with S to reduce inclusions, and N is an austenite-stabilizing element; the addition, as necessary, of one or more from among Mo: <0.5%, Cr: <1%, V: <0.3%, Ti: <0.06%, Nb: <0.06%, B: <0.01%, REM: <0.05%, Ca: <0.05%, Zr: <0.05%, Mg: <0.05%, Zn: <0.02%, W: <0.05%, As: <0.02%, N: <0.03% and O: <0.05% will not interfere with the gist of the invention. The effects of these elements are saturated beyond the upper limits given above, and therefore any further addition simply increases the cost.

The steel sheet of the invention comprises the basic components described above, but the gist of the invention is not hampered even if other elements are included in addition to these and Fe, such as Ta, Te, Be, Ru, Os, Rh, Ir, Pd, Pt, Ag, Au, Cd, Hg, Ge, Pb, Sb, Bi, Se and Te which are commonly included unavoidably in steel, and these elements may be added at up to 0.01% in total.

The ductility of the steel sheet of the invention as a final product is determined by the volume percentage of retained austenite in the product. Although the retained austenite in the microstructure is stably present in the absence of deformation, applied deformation transforms it into martensite resulting in transform-induced plasticity, thus giving satisfactory formability with high strength. If the volume percentage of retained austenite is less than 2% the effect will not be clearly recognizable. On the other hand, if the volume percentage of retained austenite is over 20%, a large amount of martensite may be present in the press forming state in cases of extremely severe shaping, which may cause problems in terms of secondary workability or impact resistance; according to the invention, therefore, the volume percentage of retained austenite is no greater than 20%. The structure also includes ferrite, bainite, martensite and carbides.

According to the invention, the steel sheet has a Zn plating layer or a Zn alloy plating layer, which will now be explained.

The Zn plating layer includes Al: ≦1% as well as, depending on the case, at least one from among Mn: <0.02%, Pb: <0.01%, Fe: <0.2%, Sb: <0.01%, Ni: <3.0%, Cu: <1.5%, Sn: <0.1%, Co: <0.1%, Cd: <0.01% and Cr: <0.05%, with the remainder Zn and unavoidable impurities. The Al content of the plating is limited to no greater than 1% because if the Al content exceeds 1% the segregated Al will form a local battery in the plating, thus impairing the corrosion resistance. If Mn, Pb, Fe, Sb, Ni, Cu, Sn, Co, Cd and Cr are present in high amounts the edge corrosion resistance is impaired, and these are therefore limited to Mn: <0.02%, Pb: <0.01%, Fe: <0.2%, Sb: <0.01%, Ni: <3.0%, Cu: <1.5%, Sn: <0.1%, Co: <0.1%, Cd: <0.01% and Cr: <0.05%.

The Zn alloy plating layer includes Fe: 8–15%, Al: ≦1% as well as, depending on the case, at least one from among Mn: <0.02%, Pb: <0.01%, Sb: <0.01%, Ni: <3.0%, Cu: <1.5%, Sn: <0.1%, Co: <0.1%, Cd: <0.01% and Cr: <0.05%, with the remainder Zn and unavoidable impurities. The Fe content of the plating is limited to at least 8% because at less than 8% the chemical treatment (phosphate treatment) properties and coating adhesion are poorer. Also, the Fe content is limited to no greater than 15% because overalloying occurs at greater than 15%, and the plating adhesion of the worked sections is poorer. The Al content of the plating is limited to no greater than 1% because when the Al content exceeds 1% the segregated Al will form a local battery in the plating, thus impairing the corrosion resistance. If Mn, Pb, Sb, Ni, Cu, Sn, Co, Cd and Cr are present in high amounts the edge corrosion resistance is impaired, and these are therefore limited to Mn: <0.02%, Pb: <0.01%, Sb: <0.01%, Ni: <3.0%, Cu: <1.5%, Sn: <0.1%, Co: <0.1%, Cd: <0.01% and Cr: <0.05%.

The Zn plating layer and Zn alloy plating layer of the invention are as described above, but they may also contain other impurities.

Furthermore, while no particular restrictions are placed on the Zn alloy plating layer thickness, from the standpoint of corrosion resistance it is preferably at least 0.1 μm and from the standpoint of workability it is preferably no thicker than 15 μm.

The hot-dip galvanized steel sheet of the invention and a process for manufacture of a hot-dip galvannealed steel sheet of the invention will now be explained.

The hot-dip galvanized steel sheet of the invention may be obtained by casting and solidifying a steel sheet satisfying the conditions for the component composition as explained above and then heating it at 1150° C. or higher for at least 45 minutes, subjecting it to hot rolling and coiling at 400–780° C., and then after descaling treatment, subjecting it to cold rolling at a reduction ratio of 35–85%, subsequently annealing it from 10 seconds to 6 minutes in the two-phase temperature range of 650–900° C., cooling it to 350–500° C. at a cooling rate of 2–200° C./s, further holding it for up to 5 minutes in that temperature range depending on the case, and finally subjecting it to hot-dip galvanizing and cooling to below 250° C. at a cooling rate of at least 5° C./s.

A hot-dip galvannealed steel sheet of the invention may be obtained by casting and solidifying a steel sheet satisfying the conditions for the component composition as explained above and then heating it at 1150° C. or higher for at least 45 minutes, subjecting it to hot rolling and coiling at 400–780° C., and then after descaling treatment, subjecting it to cold rolling at a reduction ratio of 35–85%, subsequently annealing from 10 seconds to 6 minutes in the two-phase temperature range of 650–900° C., cooling it to 350–500° C. at a cooling rate of 2–200° C./s, further holding it for up to 5 minutes in that temperature range depending on the case, and finally subjecting it to hot-dip galvanizing and further holding it from 5 seconds to 1 minute in a temperature range of 450–600° C. prior to cooling to below 250° C. at a cooling rate of at least 5° C./s.

The reasons for each of these manufacturing conditions will now be explained.

The holding temperature and holding time after casting and solidification are important to increase the Ni concentration of the steel sheet surface layer section prior to plating. Because Ni is more resistant to oxidation than Fe, Ni is not incorporated in the oxidation scales produced during heating, and therefore concentrates in the steel sheet surface layer. The concentrated Ni remains even after cold rolling, thus improving the plating properties. For the relationship between Ni, Si and Al in a 0.5 μm steel sheet surface layer to satisfy Ni(%) ≧¼ Si+⅓ Al(%), it is necessary for the heating temperature to be at least 1150° C. and the holding time at 1150° C. or higher to be at least 45 minutes.

The coiling temperature after hot rolling is also important to increase the Ni concentration of the steel sheet surface layer section prior to plating. Ni also fails to be incorporated in the oxidation scales produced after coiling, thus concentrating in the steel sheet surface layer and improving the plating properties. When steel such as a steel according to the invention is coiled at low temperature, the Ni concentration is insufficient leading to problems with the Zn plating adhesion, while hardening results at burnt sections, thus complicating the subsequent scale removal by acid washing, etc. and the cold rolling. Conversely, when coiling is carried out at high temperature the Zn plating property is improved and the cementite becomes coarser and softer thus facilitating acid washing and cold rolling, but too much time is then required for renewed dissolution of the cementite during annealing, such that sufficient austenite is not retained. Consequently, it was determined that the coiling after hot rolling must be carried out at 400–780° C. to avoid such inconveniences. However, since it is desirable for the acid washing and cold rolling of hot-rolled steel sheets to be as easy as possible, the coiling temperature is preferably 550–750° C.

The hot rolling is followed by descaling, but there are no particular restrictions on the descaling method.

If the cold rolling reduction ratio is less than 35% the structure will not be sufficiently fine and the ductility will therefore be inferior due to insufficient retained austenite in the subsequent annealing step. On the other hand, if the reduction ratio is greater than 85% there will be too great a load on the rolling machine, and therefore the optimum reduction ratio during cold rolling was determined to be 35–85%.

In continuous annealing of the cold rolled steel sheet after cold rolling, heating is first performed in a temperature range from the Ac1 transformation point to the Ac3 transformation point to make a two-phase microstructure [ferrite+austenite]. If the heating temperature at this time is below 650° C., too much time will be required for renewed dissolution of the cementite and only a small amount of austenite will be present, and therefore the lower limit for the heating temperature is 650° C. If the heating temperature is too high the volume percentage of austenite becomes too large and the C concentration of the austenite is reduced, and therefore the upper limit for the heat temperature is 900° C. If the holding time is too short there will tend to be more non-dissolved carbides present, and the amount of austenite will be reduced. If the holding time is lengthened the crystal grains will have a greater tendency to become coarse, resulting in a poorer strength/ductility balance. According to the invention, therefore, the holding time is set to be from 10 seconds to 6 minutes.

After holding at annealing temperature, steel sheets are cooled to 350–500° C., at a cooling rate of 2–200° C./s. This is for the purpose of bringing the austenite produced by heating in the two-phase range directly to the bainite transformation range without transformation to perlite, so that, by subsequent treatment, the desired microstructure and properties are obtained. If the cooling rate at this time is less than 2° C./s, most of the austenite will transform to perlite during cooling, so that the amount of retained austenite cannot be guaranteed. If the cooling rate is greater than 200° C./s, the cooling end point temperature will vary largely in the widthwise direction and lengthwise direction, making it impossible to manufacture a uniform steel sheet.

This may be followed by holding at up to 5 minutes in a range of 350–500° C., depending on the case. Holding at this temperature prior to Zn plating accelerates bainite transformation and allows stabilization of retained austenite with concentrated C, to allow more stable manufacture of a steel sheet with both strength and elongation. If the cooling end point temperature from the two-phase range is a temperature higher than 500° C., the subsequent temperature holding will result in decomposition of austenite to carbides, such that no austenite can be retained. If the cooling end point temperature is below 350° C., the greater part of the austenite transforms to martensite and, therefore, despite higher strength the press formability is inferior while the steel sheet temperature must be increased during Zn plating thus requiring application of greater heat energy and creating an inefficient situation. If the holding time exceeds 5 minutes both the strength and press formability are inferior due to precipitation of carbides and loss of untransformed austenite by heating after Zn plating, and therefore the holding temperature is limited to no longer than 5 minutes.

For manufacture of a hot-dip galvanized steel sheet, the plating is followed by cooling to below 250° C. at a cooling rate of 5° C./s or greater. This accelerates bainite transformation during Zn plating, producing a microstructure comprising a combination of virtually carbide-free bainite and retained austenite in which C that has been swept out from those sections has been concentrated and the Ms point has fallen to below room temperature, and ferrite that is purified during the two-phase range heating; the result is both high strength and formability. Consequently, if the cooling rate after holding is slower than 5° C. or the cooling end point temperature is higher than 250° C., the austenite with concentrated C after cooling will also precipitate carbide and decompose to bainite, such that the desired object cannot be achieved due to a reduced amount of retained austenite for improvement of the workability by transformation induced plasticity. In order to leave a greater amount of retained austenite, a holding time of less than 5 minutes in a temperature range of 350–400° C. after hot-dip zinc plating is preferred.

For manufacture of a hot-dip galvannealed steel sheet, the hot-dip galvanizing is followed by holding from 5 seconds to 1 minute in a temperature range of 450–600° C., and then by cooling to below 250° C. at a cooling rate of at least 5 ° C./s. This is for the alloying reaction between Fe and Zn, and also for structural considerations. With steel according to the invention, which also contains Si or Al, it is possible to utilize the fact that transformation from austenite to bainite is separated in two stages, to realize a structure comprising a combination of virtually carbide-free bainite and retained austenite in which C that has been swept out from those sections has been concentrated and the Ms point has fallen to below room temperature, as well as ferrite that is purified during the biphase range heating, whereby both high strength and formability are achieved. If the holding temperature exceeds 600° C., perlite is produced and retained austenite is therefore absent, while the alloying reaction proceeds leading to excessive an Fe concentration of greater than 15% in the plating. On the other hand, if the heating temperature is below 450° C. the alloying reaction rate of the plating is slowed, so that the Fe concentration of the plating is lower. Also, with a holding time of less than 5 seconds the bainite production is insufficient and the C concentration in the non-transformed austenite is also insufficient, such that martensite is produced during cooling thus impairing the formability, while the alloying reaction of the plating is also inadequate. If the holding time is longer than one minute, the plating becomes overalloyed, thus tending to result in peeling of the plating during shaping. If the cooling rate after holding is slower than 5° C., the bainite transformation will proceed when the cooling end point temperature is above 250° C., and even the austenite with concentrated C due to the previous reaction will precipitate carbide and decompose to bainite, so that the desired object cannot be achieved due to a reduced amount of retained austenite for improvement of the workability by transformation induced plasticity.

The hot-dip galvanizing temperature is preferably between the melting temperature of the plating bath and 500° C. If it is above 500° C. the vapor from the plating bath becomes excessive to the point of hampering manageability. While there is no need for particular restrictions on the heating rate to the holding temperature after plating, from the standpoint of the plating structure and steel microstructure it is preferably 3 ° C./s.

The heating temperatures and cooling temperatures for each step described above do not need to be constant so long as they are within the specified ranges, and with variation within those ranges there is no deterioration, and there is often improvement, in the properties of the final product.

For further improvement in the plating adhesion, a simple or composite plating of Ni, Cu, Co or Fe may be provided on the steel sheet prior to the plating annealing after cold rolling. For still further improvement in the plating adhesion, the atmosphere during the steel sheet annealing may be adjusted so that the steel sheet surface is oxidized first and then reduced for purification of the steel sheet surface before plating. There is also no problem with further improving the plating adhesion by acid washing or polishing before annealing to remove oxides from the steel sheet surface. Such treatment can greatly enhance the plating adhesion.

EXAMPLES

Steel comprising the components listed in Table 1 was hot rolled, cold rolled, annealed and plated under the conditions shown in Table 2, and then subjected to tempered rolling at 0.6% to manufacture steel sheets. The manufactured steel sheets were subjected to the "tensile test", "retained austenite measurement test", "welding test", "0.5 μm steel sheet surface layer section analysis", "plating property", "plating adhesion" and "plating layer concentration measurement", as explained below.

The "tensile test" was an ordinary temperature tensile test conducted on a JIS #5 tensile test strip, with a gauge thickness of 50 mm and a pull rate of 10 mm/min.

The "retained austenite measurement test" was measurement by the so-called "15-peak" method whereby a ¼ inner layer of the sheet thickness from the surface layer is chemically polished and the α-Fe and γ-Fe intensity are determined by X-ray analysis using an Mo tube.

"The welding test" was carried out by spot welding under the conditions, welding current: 10 kA, applied pressure: 220 kg, welding time: 12 cycles, electrode diameter: 6 mm, electrode shape: domed, tip 6Φ-40R, and the number of continuous spots until the point at which the nugget diameter fell below 4 t (t: sheet thickness) was evaluated. The evaluation scale was the following. ○: >1000 continuous spots, Δ: 500–1000 continuous spots, ●: <500 continuous spots. Here, ○ was defined as acceptable and Δ/● as unacceptable.

The "0.5 μm steel sheet surface layer section analysis" was based on two types, measurement by EPMA analysis of a 0.5 μm steel sheet section at the plating/sheet interface of a cross-section of the plated steel sheet, and EDS analysis by TEM observation of a sample prepared by the FIB method. For the measurement, a standard sample was used to construct a calibration curve. There was practically no difference between the measurements.

The "plating property" was determined by visually judging the condition of any non-plated sections on the outside of the plated steel sheet, and was evaluated based on the following scale. ⊚ ≦ 3/dm$^2$, ○: 4–10/dm$^2$, Δ: 11–15/dm$^2$, ●: ≧16/dm$^2$. Here, ⊚/○ were defined as acceptable and Δ/● as unacceptable.

The "plating adhesion" was determined by subjecting the plated steel sheet to a tape test after a 60° V bend test, and was evaluated based on the following scale.

Tape test blackening (%)

Evaluation: ⊚. . . 0–<10

Evaluation: ○. . . 10–<20

Evaluation: Δ. . . 20–<30

Evaluation: ● . . . ≧30

(⊚/○=acceptable, Δ/●=unacceptable)

The "plating layer concentration measurement" was conducted by ICP emission analysis after dissolving the plating layer in 5% hydrochloric acid containing an amine-based inhibitor.

The results of the performance evaluation tests are shown in Tables 3 and 4. Samples 1–32 of the invention were hot-dip galvanized steel sheets and hot-dip galvannealed steel sheets with 2–20% retained austenite, total elongation of at least 30% even at 550 MPa or greater, and both satisfactory high strength and press formability, with satisfactory plating properties and weldability as well. In contrast, samples 33 and 34 had low C concentrations, samples 35 and 36 had high C concentrations, samples 37 and 38 had low Si concentrations, samples 39 and 40 had high Si concentrations, samples 41 and 42 had low Al concentrations, samples 43 and 44 had high Al concentrations, samples 45 and 46 failed to satisfy the relationship between Si and Al in the steel, samples 47 and 48 failed to satisfy the relationship for the concentrations in 0.5 μm of the steel sheet surface, samples 49 and 50 had low Mn concentrations, samples 51 and 52 had high Mn concentrations, samples 53 and 54 had high P concentrations, samples 55 and 56 had high S concentrations, samples 57 and 58 had low Ni concentrations, samples 59 and 60 had high Ni concentrations, samples 61 and 62 had high Cu concentrations and samples 63 and 64 had high Al concentrations in the platings; these failed to satisfy the retained austenite amount, combination of high strength and press formability, plating properties and weldability, and the object of the invention was not achieved.

Even with steel according to the invention, any problem with any of the treatment conditions fails to satisfy all of the conditions for the retained austenite amount, combination of high strength and press formability, plating properties and weldability, as in the case of samples 65–98, and the object of the invention therefore cannot be achieved.

TABLE 1

| | Component (weight %) | | | | | | | | | | | | | Other added elements | Reference |
|---|---|---|---|---|---|---|---|---|---|---|---|---|---|---|---|
| | C | Si | Mn | Al | P | S | N | O | Ni | Cu | B | Si + 0.8Al | B × Cu | | |
| a | 0.096 | 1.42 | 1.12 | 0.04 | 0.014 | 0.005 | 0.0032 | 0.0023 | 0.61 | 0.03 | — | 1.452 | — | — | inv. ex. |
| b | 0.12 | 0.82 | 1.12 | 0.06 | 0.012 | 0.004 | 0.0034 | 0.0022 | 1.13 | 0.03 | — | 0.868 | — | — | inv. ex. |
| c | 0.082 | 1.02 | 0.82 | 0.82 | 0.009 | 0.003 | 0.0042 | 0.0145 | 2.35 | 0.04 | — | 1.676 | — | — | inv. ex. |
| d | 0.18 | 1.45 | 4.2 | 0.23 | 0.021 | 0.011 | 0.0120 | 0.0282 | 4.2 | 0.34 | — | 1.634 | — | — | inv. ex. |
| e | 0.06 | 0.32 | 2.21 | 0.12 | 0.008 | 0.009 | 0.0031 | 0.0023 | 0.41 | 0.04 | — | 0.416 | — | — | inv. ex. |
| f | 0.082 | 0.31 | 1.02 | 1.32 | 0.014 | 0.005 | 0.0024 | 0.0019 | 1.32 | 0.03 | — | 1.366 | — | — | inv. ex. |
| g | 0.11 | 0.92 | 1.34 | 0.04 | 0.011 | 0.004 | 0.0034 | 0.0022 | 0.42 | 1.12 | — | 0.952 | — | — | inv. ex. |
| h | 0.092 | 0.82 | 0.92 | 0.13 | 0.005 | 0.006 | 0.0042 | 0.0052 | 0.33 | 0.11 | 6E-04 | 0.924 | 0.00007 | — | inv. ex. |
| i | 0.14 | 1.13 | 1.04 | 0.08 | 0.011 | 0.014 | 0.0072 | 0.0253 | 0.73 | 0.34 | — | 1.194 | — | Co: 0.08 | inv. ex. |
| j | 0.06 | 0.82 | 0.52 | 1.33 | 0.028 | 0.031 | 0.0031 | 0.0028 | 3.22 | 1.23 | — | 1.884 | — | Sn: 0.09, Co: 0.03 | inv. ex. |
| k | 0.12 | 1.92 | 0.22 | 0.03 | 0.007 | 0.003 | 0.0028 | 0.0017 | 4.73 | 1.11 | 0.008 | 1.944 | 0.0091 | Mo: 0.2 | inv. ex. |
| l | 0.14 | 1.91 | 0.54 | 0.03 | 0.027 | 0.016 | 0.0228 | 0.0031 | 3.95 | 1.41 | — | 1.936 | — | Cr: 0.8 | inv. ex. |
| m | 0.072 | 0.97 | 0.59 | 0.40 | 0.001 | 0.013 | 0.0289 | 0.0105 | 0.73 | 0.93 | — | 1.293 | — | V: 0.13 | inv. ex. |
| n | 0.16 | 1.01 | 2.36 | 0.71 | 0.023 | 0.014 | 0.0263 | 0.0119 | 3.51 | 0.54 | — | 1.581 | — | Ti: 0.03 | inv. ex. |
| o | 0.17 | 1.23 | 2.20 | 0.76 | 0.020 | 0.008 | 0.0008 | 0.0282 | 1.88 | 1.14 | 0.008 | 1.844 | 0.00931 | Nb: 0.04 | inv. ex. |
| p | 0.13 | 1.36 | 2.13 | 0.19 | 0.025 | 0.001 | 0.0199 | 0.0144 | 1.79 | 0.78 | — | 1.513 | — | REM(Ce): 0.02 | inv. ex. |
| q | 0.065 | 1.92 | 0.43 | 0.04 | 0.004 | 0.019 | 0.0060 | 0.0233 | 4.15 | 1.10 | — | 1.959 | — | Ca: 0.02 | inv. ex. |
| r | 0.17 | 0.22 | 0.40 | 0.42 | 0.005 | 0.002 | 0.0225 | 0.0167 | 0.40 | 0.07 | — | 0.556 | — | Zr: 0.03 | inv. ex. |
| s | 0.19 | 0.72 | 0.74 | 0.50 | 0.020 | 0.002 | 0.0260 | 0.0253 | 1.50 | 1.31 | 5E-04 | 1.116 | 0.00068 | Mg: 0.02 | inv. ex. |
| t | 0.066 | 1.58 | 1.75 | 0.20 | 0.023 | 0.005 | 0.0016 | 0.0040 | 4.63 | 0.69 | — | 1.745 | — | Zn: 0.01 | inv. ex. |
| u | 0.11 | 0.72 | 2.11 | 0.75 | 0.019 | 0.002 | 0.0118 | 0.0167 | 4.96 | 0.04 | — | 1.313 | — | W: 0.04 | inv. ex. |
| v | 0.10 | 1.43 | 0.85 | 0.11 | 0.024 | 0.017 | 0.0252 | 0.0286 | 0.74 | 1.93 | — | 1.514 | — | As: 0.01 | inv. ex. |
| w | 0.077 | 1.03 | 1.20 | 0.83 | 0.029 | 0.004 | 0.0118 | 0.0213 | 3.49 | 0.56 | — | 1.692 | — | Sn: 0.02, Mo: 0.32, Ti: 0.04 | inv. ex. |
| x | 0.084 | 1.58 | 0.21 | 0.09 | 0.007 | 0.015 | 0.0023 | 0.0021 | 4.79 | 1.55 | 0.003 | 1.650 | 0.00419 | Cr: 0.32, Nb: 0.02, Mg: 0.02 | inv. ex. |
| y | 0.18 | 1.12 | 2.17 | 0.73 | 0.010 | 0.001 | 0.0154 | 0.0272 | 3.77 | 0.48 | — | 1.707 | — | Ti: 0.02, Nb: 0.03, Ca: 0.03, As: 0.005 | inv. ex. |
| z | 0.12 | 1.23 | 0.52 | 0.12 | 0.029 | 0.019 | 0.0088 | 0.0251 | 2.57 | 0.65 | 0.007 | 1.325 | 0.00465 | V: 0.22, W: 0.01, REM(Y): 0.01, Zr: 0.02 | inv. ex. |
| ab | 0.082 | 0.37 | 1.77 | 0.26 | 0.027 | 0.004 | 0.0024 | 0.0052 | 0.96 | 0.44 | — | 0.576 | — | Mo: 0.11, Mg: 0.01 | inv. ex. |
| ac | 0.12 | 0.79 | 0.39 | 0.92 | 0.015 | 0.015 | 0.0057 | 0.0145 | 3.57 | 0.49 | — | 1.527 | — | Cr: 0.42, Ti: 0.02, Nb: 0.02 | inv. ex. |
| ad | 0.03 | 1.06 | 1.03 | 0.55 | 0.003 | 0.005 | 0.0133 | 0.0034 | 1.73 | 0.43 | — | 1.500 | — | — | comp. ex. |
| ae | 0.24 | 0.89 | 1.39 | 0.34 | 0.006 | 0.001 | 0.0023 | 0.0151 | 0.65 | 0.05 | — | 1.162 | — | — | comp. ex. |
| af | 0.13 | 0.18 | 1.34 | 0.39 | 0.007 | 0.003 | 0.0009 | 0.0203 | 0.42 | 1.33 | — | 0.492 | — | — | comp. ex. |
| ag | 0.16 | 2.11 | 0.97 | 0.24 | 0.008 | 0.002 | 0.0110 | 0.0133 | 4.76 | 1.92 | 8E-04 | 2.302 | 0.00153 | Sn: 0.01, Cr: 0.25 | comp. ex. |
| ah | 0.15 | 1.26 | 0.58 | 0.001 | 0.004 | 0.007 | 0.0176 | 0.0202 | 0.67 | 1.71 | — | 1.261 | — | — | comp. ex. |
| ai | 0.072 | 0.65 | 1.52 | 1.59 | 0.005 | 0.003 | 0.0192 | 0.0292 | 4.21 | 0.71 | — | 1.922 | — | — | comp. ex. |
| aj | 0.10 | 0.22* | 0.85 | 0.11* | 0.024 | 0.017 | 0.0252 | 0.0286 | 0.75 | 1.93 | — | 0.307 | — | Mo: 0.04, Ti: 0.02 | comp. ex. |
| ak | 0.12 | 1.72* | 0.52 | 0.59* | 0.029 | 0.019 | 0.0088 | 0.0251 | 4.73 | 0.65 | 0.007 | 2.192 | 0.00465 | — | comp. ex. |
| al | 0.11 | 2.12 | 0.18 | 0.22 | 0.008 | 0.003 | 0.0133 | 0.0106 | 1.84 | 0.10 | — | 2.296 | — | Mo: 0.12 | comp. ex. |
| am | 0.14 | 0.73 | 2.62 | 0.54 | 0.009 | 0.005 | 0.0065 | 0.0269 | 0.59 | 0.85 | — | 1.162 | — | — | comp. ex. |
| an | 0.092 | 1.12 | 0.69 | 0.14 | 0.035 | 0.007 | 0.0092 | 0.0024 | 0.94 | 0.05 | — | 1.232 | | Ca: 0.03, Mg: 0.02 | comp. ex. |
| ao | 0.12 | 0.82 | 1.27 | 0.22 | 0.008 | 0.024 | 0.0024 | 0.0042 | 0.82 | 1.18 | — | 0.996 | — | — | comp. ex. |
| ap | 0.062 | 1.77 | 0.82 | 0.04 | 0.017 | 0.017 | 0.0270 | 0.0120 | 0.17 | 0.02 | 0.01 | 1.802 | 0.0002 | Ti: 0.04 | comp. ex. |
| aq | 0.18 | 0.23 | 0.23 | 0.67 | 0.004 | 0.002 | 0.0087 | 0.0037 | 5.23 | 0.04 | — | 0.766 | — | V: 0.21, Zr: 0.02 | comp. ex. |
| ar | 0.072 | 1.22 | 0.82 | 0.08 | 0.028 | 0.007 | 0.0028 | 0.0024 | 0.81 | 2.17 | — | 1.284 | — | — | comp. ex. |

Note:
The underlined values in the tables are those outside of the ranges of the invention.
The "*" marks indicate cases where the relationship between Si and Al was not satisfied.

TABLE 2

| | Steel | Heating temperature (°C) | Heating time (min) | Coiling temperature (°C) | Cold rolling draft (%) | Anneal temperature (°C) | Anneal time (sec) | Cooling rate (°C/s) | Pre-plating holding temperature (°C) | Holding time (s) | Plating temperature (°C) | Alloying temperature (°C) | Alloying time (s) | Post-plating holding temperature (°C) | Holding time (sec) | Cooling rate (°C/s) | Cooling temperature (°C) |
|---|---|---|---|---|---|---|---|---|---|---|---|---|---|---|---|---|---|
| 1 | a | 1250 | 50 | 700 | 70 | 810 | 100 | 10 | — | — | 440 | — | — | — | — | 10 | 180 |
| 2 | a | 1200 | 60 | 680 | 65 | 800 | 80 | 30 | 400–450 | 60 | 450 | — | — | — | — | 20 | 180 |
| 3 | a | 1180 | 80 | 720 | 70 | 760 | 120 | 8 | 400–450 | 30 | 430 | 530 | 20 | 350–430 | 30 | 10 | 150 |
| 4 | a | 1230 | 70 | 550 | 70 | 800 | 230 | 15 | — | — | 450 | 500 | 25 | — | — | 8 | 200 |
| 5 | a | 1200 | 60 | 680 | 75 | 820 | 150 | 20 | 400–450 | 10 | 460 | 480 | 60 | — | — | 16 | 150 |
| 6 | a | 1270 | 50 | 650 | 60 | 660 | 90 | 25 | — | — | 440 | — | — | — | — | 10 | 150 |
| 7 | b | 1210 | 80 | 660 | 75 | 850 | 50 | 60 | — | — | 430 | — | — | — | — | 8 | 200 |
| 8 | c | 1160 | 100 | 600 | 50 | 720 | 80 | 150 | 360–440 | 30 | 470 | 500 | 30 | — | — | 12 | 180 |
| 9 | d | 1190 | 80 | 700 | 60 | 770 | 130 | 3 | — | — | 460 | 510 | 25 | — | — | 10 | 210 |
| 10 | e | 1260 | 55 | 450 | 50 | 820 | 330 | 15 | — | — | 450 | — | — | 350–430 | 30 | 20 | 180 |
| 11 | f | 1200 | 70 | 700 | 60 | 680 | 130 | 30 | — | — | 430 | 500 | 30 | — | — | 10 | 220 |
| 12 | g | 1170 | 70 | 600 | 65 | 750 | 60 | 15 | — | — | 450 | — | — | — | — | 15 | 180 |
| 13 | h | 1190 | 60 | 770 | 70 | 830 | 250 | 8 | — | — | 440 | — | — | — | — | 10 | 150 |
| 14 | i | 1160 | 80 | 650 | 75 | 700 | 80 | 50 | 350–400 | 290 | 450 | 480 | 50 | — | — | 7 | 200 |
| 15 | j | 1200 | 70 | 700 | 70 | 830 | 30 | 100 | — | — | 430 | 500 | 25 | — | — | 10 | 160 |
| 16 | k | 1250 | 60 | 600 | 70 | 650 | 60 | 30 | — | — | 450 | — | — | — | — | 20 | 130 |
| 17 | l | 1220 | 80 | 630 | 68 | 750 | 100 | 10 | — | — | 460 | 520 | 20 | — | — | 10 | 200 |
| 18 | m | 1190 | 90 | 750 | 40 | 800 | 90 | 60 | 400–450 | 40 | 440 | — | — | — | — | 15 | 180 |
| 19 | n | 1200 | 60 | 450 | 50 | 770 | 100 | 15 | — | — | 430 | 550 | 10 | — | — | 7 | 210 |
| 20 | o | 1160 | 70 | 620 | 70 | 650 | 30 | 5 | — | — | 470 | — | — | — | — | 10 | 180 |
| 21 | p | 1260 | 50 | 570 | 60 | 820 | 70 | 100 | 400–490 | 15 | 460 | 480 | 40 | — | — | 12 | 150 |
| 22 | q | 1190 | 80 | 660 | 75 | 670 | 160 | 30 | — | — | 450 | 580 | 10 | — | — | 10 | 200 |
| 23 | r | 1200 | 70 | 700 | 70 | 760 | 90 | 20 | — | — | 430 | 500 | 30 | — | — | 20 | 15 |
| 24 | s | 1240 | 70 | 480 | 66 | 810 | 280 | 45 | 360–440 | 60 | 440 | — | — | 350–430 | 30 | 10 | 130 |
| 25 | t | 1230 | 50 | 620 | 50 | 670 | 160 | 80 | — | — | 450 | — | — | — | — | 8 | 200 |
| 26 | u | 1190 | 60 | 550 | 75 | 730 | 30 | 30 | — | — | 430 | 510 | 25 | — | — | 20 | 180 |
| 27 | v | 1260 | 50 | 670 | 45 | 750 | 180 | 20 | — | — | 450 | 500 | 30 | — | — | 10 | 210 |
| 28 | w | 1270 | 70 | 700 | 60 | 820 | 30 | 5 | — | — | 460 | 500 | 60 | — | — | 15 | 180 |
| 29 | x | 1150 | 90 | 750 | 55 | 820 | 150 | 30 | — | — | 450 | 460 | 40 | — | — | 10 | 220 |
| 30 | y | 1250 | 80 | 580 | 40 | 670 | 130 | 70 | 400–450 | 50 | 460 | 520 | 40 | — | — | 7 | 180 |
| 31 | z | 1210 | 70 | 650 | 70 | 770 | 220 | 60 | — | — | 440 | — | — | — | — | 10 | 250 |
| 32 | ab | 1180 | 90 | 660 | 75 | 680 | 60 | 20 | — | — | 430 | 500 | 20 | — | — | 20 | 180 |
| 33 | ac | 1200 | 80 | 570 | 50 | 830 | 80 | 150 | — | — | 470 | 480 | 30 | — | — | 10 | 220 |
| 34 | ad | 1160 | 100 | 600 | 60 | 720 | 130 | 3 | — | — | 460 | — | — | — | — | 8 | 180 |
| 35 | ad | 1190 | 80 | 700 | 60 | 770 | 130 | 15 | 400–450 | 40 | 450 | 540 | 15 | — | — | 16 | 180 |
| 36 | ae | 1260 | 55 | 450 | 50 | 820 | 330 | 30 | — | — | 430 | — | — | — | — | 10 | 150 |
| 37 | ae | 1200 | 70 | 700 | 60 | 680 | 130 | 15 | — | — | 450 | 520 | 20 | — | — | 10 | 200 |
| 38 | af | 1170 | 70 | 600 | 65 | 750 | 60 | 8 | — | — | 440 | — | — | — | — | 8 | 170 |
| 39 | af | 1190 | 60 | 770 | 70 | 830 | 250 | 50 | 400–450 | 50 | 450 | 500 | 30 | — | — | 12 | 130 |
| 40 | ag | 1160 | 80 | 650 | 75 | 700 | 80 | 100 | 400–450 | 50 | 430 | — | — | — | — | 20 | 200 |
| 41 | ah | 1200 | 70 | 600 | 70 | 650 | 60 | 30 | — | — | 450 | 480 | 30 | — | — | 10 | 180 |

TABLE 2-continued

| Steel | Heating temperature (°C.) | Heating time (min) | Coiling temperature (°C.) | Cold rolling draft (%) | Anneal temperature (°C.) | Anneal time (sec) | Cooling rate (°C./s) | Pre-plating holding temperature (°C.) | Holding time (s) | Plating temperature (°C.) | Alloying temperature (°C.) | Alloying time (s) | Post-plating holding temperature (°C.) | Holding time (sec) | Cooling rate (°C./s) | Cooling temperature (°C.) |
|---|---|---|---|---|---|---|---|---|---|---|---|---|---|---|---|---|
| 42 | ah | 1220 | 80 | 630 | 68 | 750 | 100 | 10 | — | — | 460 | — | — | 350–430 | 30 | 15 | 210 |
| 43 | ai | 1160 | 100 | 600 | 50 | 720 | 80 | 150 | — | — | 440 | 550 | 20 | — | — | 10 | 180 |
| 44 | ai | 1190 | 80 | 700 | 60 | 770 | 130 | 3 | — | — | 430 | — | — | — | — | 7 | 220 |
| 45 | ai | 1260 | 55 | 450 | 50 | 820 | 330 | 15 | 360–440 | 50 | 470 | 580 | 10 | — | — | 10 | 180 |
| 46 | ai | 1200 | 70 | 700 | 60 | 680 | 130 | 30 | — | — | 460 | — | — | — | — | 20 | 250 |
| 47 | ak | 1170 | 70 | 600 | 65 | 750 | 60 | 15 | — | — | 450 | 480 | 60 | — | — | 10 | 180 |
| 48 | ak | 1190 | 60 | 770 | 70 | 830 | 250 | 8 | — | — | 430 | — | — | — | — | 8 | 250 |
| 49 | al | 1160 | 80 | 650 | 75 | 700 | 80 | 50 | — | — | 440 | 500 | 30 | — | — | 16 | 180 |
| 50 | al | 1200 | 70 | 700 | 70 | 830 | 30 | 100 | — | — | 450 | — | — | — | — | 10 | 180 |
| 51 | al | 1250 | 60 | 600 | 70 | 650 | 60 | 30 | — | — | 430 | 500 | 20 | 350–430 | 50 | 10 | 220 |
| 52 | am | 1220 | 80 | 630 | 68 | 750 | 100 | 10 | 400–450 | 40 | 450 | — | — | — | — | 12 | 180 |
| 53 | am | 1190 | 90 | 750 | 40 | 800 | 90 | 60 | — | — | 460 | 520 | 20 | — | — | 10 | 250 |
| 54 | an | 1200 | 60 | 450 | 50 | 770 | 100 | 15 | — | — | 450 | — | — | — | — | 15 | 180 |
| 55 | an | 1160 | 70 | 620 | 70 | 650 | 30 | 5 | — | — | 460 | 490 | 30 | — | — | 7 | 220 |
| 56 | ao | 1260 | 50 | 570 | 60 | 820 | 70 | 100 | 360–440 | 100 | 440 | — | — | — | — | 10 | 180 |
| 57 | ao | 1190 | 80 | 660 | 75 | 670 | 160 | 30 | — | — | 430 | 560 | 15 | — | — | 12 | 180 |
| 58 | ap | 1240 | 70 | 700 | 70 | 760 | 90 | 20 | — | — | 470 | — | — | — | — | 10 | 150 |
| 59 | ap | 1230 | 50 | 480 | 66 | 810 | 280 | 45 | — | — | 460 | 500 | 30 | — | — | 20 | 200 |
| 60 | aq | 1190 | 60 | 620 | 50 | 670 | 160 | 80 | — | — | 450 | — | — | 350–430 | 10 | 10 | 160 |
| 61 | ar | 1175 | 90 | 590 | 45 | 790 | 70 | 160 | — | — | 430 | 480 | 40 | — | — | 15 | 130 |
| 62 | ar | 1200 | 60 | 450 | 50 | 770 | 100 | 15 | — | — | 450 | — | — | — | — | 10 | 200 |
| 63 | a | 1250 | 50 | 700 | 70 | 810 | 100 | 10 | — | — | 440 | 530 | 20 | — | — | 10 | 180 |
| 64 | a | 1230 | 70 | 550 | 70 | 800 | 230 | 15 | — | — | 430 | 480 | 30 | — | — | 8 | 200 |
| 65 | a | 1140 | 80 | 760 | 60 | 810 | 130 | 70 | — | — | 430 | 550 | 20 | — | — | 7 | 180 |
| 66 | a | 1240 | 40 | 630 | 65 | 680 | 50 | 30 | — | — | 440 | — | — | — | — | 10 | 210 |
| 67 | a | 1160 | 90 | 700 | 75 | 730 | 90 | 15 | 400–450 | 20 | 450 | 500 | 30 | — | — | 20 | 180 |
| 68 | a | 1200 | 60 | 380 | 70 | 660 | 220 | 40 | — | — | 430 | 460 | 60 | — | — | 10 | 220 |
| 69 | a | 1280 | 60 | 790 | 30 | 750 | 80 | 60 | — | — | 450 | 520 | 40 | — | — | 8 | 180 |
| 70 | a | 1160 | 80 | 620 | 55 | 660 | 150 | 10 | — | — | 460 | 500 | 30 | — | — | 16 | 250 |
| 71 | a | 1260 | 60 | 580 | 60 | 630 | 90 | 100 | — | — | 450 | 480 | 40 | — | — | 10 | 180 |
| 72 | a | 1250 | 60 | 720 | 75 | 920 | 5 | 6 | — | 15 | 430 | 500 | 20 | — | — | 10 | 250 |
| 73 | a | 1160 | 70 | 550 | 60 | 750 | 380 | 130 | 300–350 | 5 | 450 | 550 | 15 | — | — | 12 | 180 |
| 74 | a | 1170 | 70 | 640 | 50 | 680 | 80 | 1 | 480–530 | 350 | 460 | 480 | 30 | — | — | 10 | 170 |
| 75 | a | 1160 | 100 | 600 | 60 | 720 | 130 | 10 | 360–440 | 15 | 440 | 550 | 10 | — | — | 15 | 180 |
| 76 | a | 1190 | 80 | 700 | 50 | 770 | 330 | 60 | — | 5 | 430 | 510 | 15 | — | — | 7 | 220 |
| 77 | a | 1260 | 55 | 450 | 60 | 820 | 130 | 15 | 400–450 | 30 | 470 | 520 | 20 | — | — | 10 | 180 |
| 78 | a | 1200 | 70 | 700 | 65 | 680 | 60 | 5 | — | — | 460 | 430 | 60 | — | — | 12 | 250 |
| 79 | a | 1170 | 70 | 600 | 70 | 750 | 250 | 100 | — | — | 450 | 620 | 50 | — | — | 10 | 180 |
| 80 | a | 1190 | 80 | 650 | 75 | 830 | 80 | 30 | — | — | 430 | 550 | 5 | — | — | 10 | 250 |
| 81 | a | 1200 | 70 | 700 | 70 | 830 | 30 | 20 | — | — | 440 | 520 | 70 | — | — | 12 | 180 |

TABLE 2-continued

| Steel | | Heating temperature (° C.) | Heating time (min) | Coiling temperature (° C.) | Cold rolling draft (%) | Anneal temperature (° C.) | Anneal time (sec) | Cooling rate (° C./s) | Pre-plating holding temperature (° C.) | Holding time (s) | Plating temperature (° C.) | Alloying temperature (° C./s) | Alloying time (s) | Post-plating holding temperature (° C.) | Holding time (sec) | Cooling rate (° C./s) | Cooling temperature (° C.) |
|---|---|---|---|---|---|---|---|---|---|---|---|---|---|---|---|---|---|
| 82 | a | 1250 | 60 | 600 | 70 | 650 | 60 | 45 | — | — | 450 | 500 | 20 | — | — | 3 | 180 |
| 83 | a | 1220 | 80 | 630 | 68 | 750 | 100 | 80 | — | — | 450 | 510 | 20 | — | — | 15 | 300 |
| 84 | a | 1140 | 80 | 760 | 60 | 810 | 130 | 160 | — | — | 430 | — | — | — | — | 7 | 150 |
| 85 | a | 1240 | 40 | 630 | 65 | 680 | 50 | 30 | — | — | 440 | — | — | — | — | 10 | 200 |
| 86 | a | 1160 | 90 | 380 | 75 | 730 | 90 | 15 | 400–450 | 20 | 450 | — | — | 350–430 | 60 | 12 | 180 |
| 87 | a | 1200 | 60 | 790 | 70 | 660 | 220 | 40 | — | — | 430 | — | — | — | — | 10 | 180 |
| 88 | a | 1280 | 60 | 620 | 30 | 750 | 80 | 60 | — | — | 450 | — | — | — | — | 18 | 150 |
| 89 | a | 1260 | 80 | 580 | 55 | 630 | 150 | 10 | — | — | 460 | — | — | 350–430 | 10 | 10 | 180 |
| 90 | a | 1250 | 60 | 720 | 60 | 920 | 90 | 100 | — | — | 450 | — | — | — | — | 10 | 180 |
| 91 | a | 1160 | 60 | 550 | 75 | 750 | 5 | 6 | — | — | 430 | — | — | — | — | 10 | 150 |
| 92 | a | 1170 | 70 | 640 | 60 | 680 | 380 | 130 | — | — | 450 | — | — | — | — | 20 | 200 |
| 93 | a | 1190 | 60 | 600 | 65 | 780 | 160 | 1 | — | — | 460 | — | — | — | — | 10 | 170 |
| 94 | a | 1160 | 60 | 550 | 70 | 670 | 300 | 20 | 300–350 | 15 | 440 | — | — | 350–430 | 30 | 12 | 130 |
| 95 | a | 1200 | 70 | 600 | 80 | 820 | 90 | 60 | 480–530 | 5 | 430 | — | — | — | — | 10 | 200 |
| 96 | a | 1160 | 80 | 720 | 60 | 690 | 160 | 5 | 360–440 | 400 | 470 | — | — | — | — | 15 | 180 |
| 97 | a | 1190 | 60 | 580 | 65 | 740 | 130 | 3 | — | — | 440 | — | — | — | — | 3 | 210 |
| 98 | a | 1240 | 80 | 600 | 45 | 690 | 220 | 90 | — | — | 450 | — | — | — | — | 10 | 300 |

Note:
The underlined values in the tables are those outside of the ranges of the invention.
The post-plating heating rate was consistently 10° C./s. The non-alloyed samples are hot-dip zinc-plated steel sheets.

TABLE 3

| | Surface layer Ni (%) | Surface layer Cu (%) | Surface layer Co (%) | Surface layer Sn (%) | Ni + Cu + (Co + Sn) (%) | Surface layer Si (%) | Surface layer Al (%) | ¼Si + ⅓Al | TS (MPa) | El (%) | Residual γ (%) | Reference |
|---|---|---|---|---|---|---|---|---|---|---|---|---|
| 1 | 1.337 | 0.014 | — | — | 1.351 | 2.329 | 0.425 | 0.724 | 625 | 36 | 5.5 | inv. ex. |
| 2 | 1.242 | 0.015 | — | — | 1.257 | 2.484 | 0.628 | 0.830 | 611 | 38 | 6.3 | inv. ex. |
| 3 | 1.019 | 0.014 | — | — | 1.033 | 2.227 | 0.506 | 0.725 | 609 | 38 | 6.5 | inv. ex. |
| 4 | 1.113 | 0.016 | — | — | 1.129 | 2.638 | 0.694 | 0.891 | 631 | 36 | 5.4 | inv. ex. |
| 5 | 1.225 | 0.014 | — | — | 1.239 | 2.844 | 0.535 | 0.889 | 624 | 37 | 6.3 | inv. ex. |
| 6 | 1.837 | 0.042 | — | — | 1.879 | 2.076 | 0.144 | 0.567 | 645 | 35 | 4.9 | inv. ex. |
| 7 | 3.340 | 0.056 | — | — | 3.396 | 2.620 | 2.219 | 1.395 | 589 | 38 | 6.5 | inv. ex. |
| 8 | 5.321 | 0.489 | — | — | 5.810 | 3.937 | 0.571 | 1.175 | 716 | 34 | 18.5 | inv. ex. |
| 9 | 0.620 | 0.061 | — | — | 0.681 | 0.740 | 0.273 | 0.276 | 612 | 37 | 2.8 | inv. ex. |
| 10 | 1.866 | 0.044 | — | — | 1.910 | 0.852 | 3.442 | 1.361 | 563 | 39 | 4.5 | inv. ex. |
| 11 | 0.676 | 1.532 | — | — | 2.208 | 2.386 | 0.091 | 0.627 | 613 | 37 | 6.3 | inv. ex. |
| 12 | 0.446 | 0.324 | — | — | 0.770 | 2.012 | 0.347 | 0.618 | 590 | 38 | 5.5 | inv. ex. |
| 13 | 1.106 | 0.472 | — | 0.001 | 1.579 | 2.632 | 0.184 | 0.719 | 689 | 35 | 10.5 | inv. ex. |
| 14 | 4.925 | 1.329 | 0.098 | 0.123 | 6.475 | 1.947 | 3.156 | 1.539 | 616 | 36 | 3.2 | inv. ex. |
| 15 | 7.223 | 1.574 | — | — | 8.798 | 4.694 | 0.072 | 1.197 | 705 | 36 | 7.5 | inv. ex. |
| 16 | 6.406 | 2.203 | — | — | 8.609 | 4.947 | 0.079 | 1.263 | 756 | 33 | 10.3 | inv. ex. |
| 17 | 1.069 | 1.312 | — | — | 2.382 | 2.391 | 0.999 | 0.931 | 603 | 36 | 4.3 | inv. ex. |
| 18 | 4.956 | 0.809 | — | — | 5.764 | 2.428 | 1.807 | 1.209 | 805 | 35 | 13.5 | inv. ex. |
| 19 | 2.790 | 1.843 | — | — | 4.633 | 2.887 | 1.722 | 1.296 | 830 | 32 | 15.5 | inv. ex. |
| 20 | 1.985 | 1.095 | — | — | 3.080 | 3.222 | 0.422 | 0.946 | 680 | 35 | 8.3 | inv. ex. |
| 21 | 5.718 | 1.641 | — | — | 7.359 | 4.496 | 0.111 | 1.161 | 615 | 38 | 3.5 | inv. ex. |
| 22 | 0.543 | 0.105 | — | — | 0.647 | 0.546 | 1.097 | 0.502 | 604 | 36 | 14.5 | inv. ex. |
| 23 | 2.312 | 1.982 | — | — | 4.294 | 1.825 | 1.163 | 0.844 | 720 | 34 | 18.9 | inv. ex. |
| 24 | 7.288 | 1.039 | — | — | 8.328 | 4.349 | 0.499 | 1.254 | 630 | 38 | 4.5 | inv. ex. |
| 25 | 7.230 | 0.049 | — | — | 7.279 | 1.873 | 1.799 | 1.068 | 635 | 39 | 8.5 | inv. ex. |
| 26 | 1.087 | 2.823 | — | — | 3.911 | 3.701 | 0.263 | 1.013 | 640 | 36 | 6.3 | inv. ex. |
| 27 | 5.310 | 0.858 | — | 0.025 | 6.193 | 2.309 | 2.242 | 1.325 | 720 | 33 | 3.8 | inv. ex. |
| 28 | 7.311 | 2.390 | — | — | 9.701 | 4.247 | 0.210 | 1.132 | 710 | 33 | 4.5 | inv. ex. |
| 29 | 6.042 | 0.776 | — | — | 6.818 | 2.843 | 2.002 | 1.378 | 830 | 32 | 17.5 | inv. ex. |
| 30 | 3.483 | 0.927 | — | — | 4.410 | 2.979 | 0.291 | 0.842 | 620 | 36 | 8.3 | inv. ex. |
| 31 | 1.519 | 0.668 | — | — | 2.187 | 0.903 | 0.668 | 0.449 | 590 | 40 | 5.2 | inv. ex. |
| 32 | 5.172 | 0.798 | — | — | 5.970 | 2.043 | 2.201 | 1.244 | 624 | 37 | 7.5 | inv. ex. |
| 33 | 2.468 | 0.486 | — | — | 2.954 | 2.400 | 1.240 | 1.014 | 498 | 34 | <u>1.5</u> | comp. ex. |
| 34 | 2.625 | 0.596 | — | — | 3.221 | 2.389 | 1.327 | 1.040 | 504 | 35 | <u>1.3</u> | comp. ex. |
| 35 | 1.020 | 0.070 | — | — | 1.090 | 2.225 | 0.792 | 0.820 | 892 | 33 | 22.5 | comp. ex. |
| 36 | 0.925 | 0.069 | — | — | 0.994 | 2.325 | 0.932 | 0.892 | 904 | 31 | 23 | comp. ex. |
| 37 | 0.583 | 2.063 | — | — | 2.646 | 0.435 | 0.910 | 0.412 | 612 | 30 | <u>1.5</u> | comp. ex. |
| 38 | 0.625 | 2.156 | — | — | 2.781 | 0.416 | 0.892 | 0.401 | 604 | 29 | <u>1.8</u> | comp. ex. |
| 39 | 5.569 | 2.648 | 0.000 | 0.017 | 8.234 | 5.059 | 0.428 | 1.407 | 710 | 35 | 13.3 | comp. ex. |
| 40 | 6.534 | 3.142 | 0.003 | 0.010 | 9.689 | 5.539 | 0.546 | 1.567 | 720 | 36 | 14.2 | comp. ex. |
| 41 | 0.990 | 2.809 | — | — | 3.800 | 3.338 | 0.002 | 0.835 | 612 | 30 | <u>1.6</u> | comp. ex. |
| 42 | 0.980 | 2.715 | — | — | 3.695 | 3.459 | 0.004 | 0.866 | 605 | 32 | <u>1.8</u> | comp. ex. |
| 43 | 5.727 | 1.053 | — | — | 6.780 | 1.551 | 4.125 | 1.763 | 605 | 36 | 4.3 | comp. ex. |
| 44 | 6.146 | 1.214 | — | — | 7.360 | 1.429 | 3.958 | 1.677 | 600 | 37 | 4.5 | comp. ex. |
| 45 | 1.017 | 3.065 | — | — | 4.082 | 0.586 | 0.287 | 0.242 | 580 | 36 | <u>1.4</u> | comp. ex. |
| 46 | 0.814 | 2.562 | — | — | 3.376 | 0.954 | 0.359 | 0.358 | 590 | 34 | <u>1.3</u> | comp. ex. |
| 47 | 7.510 | 1.010 | — | — | 8.519 | 4.895 | 1.837 | 1.836 | 710 | 34 | 6.8 | comp. ex. |
| 48 | 8.015 | 1.136 | — | — | 9.151 | 4.526 | 1.624 | 1.673 | 705 | 33 | 7.5 | comp. ex. |
| 49 | 2.969 | 0.134 | — | — | 3.102 | 5.039 | 0.554 | 1.445 | 590 | 34 | <u>1.3</u> | comp. ex. |
| 50 | 3.015 | 0.193 | — | — | 3.208 | 4.689 | 0.456 | 1.324 | 585 | 33 | <u>1.8</u> | comp. ex. |
| 51 | 0.820 | 1.363 | — | — | 2.183 | 1.717 | 1.403 | 0.897 | 730 | 33 | 9.5 | comp. ex. |
| 52 | 0.725 | 1.236 | — | — | 1.961 | 2.016 | 1.826 | 1.113 | 725 | 34 | 10.3 | comp. ex. |
| 53 | 1.289 | 0.069 | — | — | 1.358 | 2.601 | 0.358 | 0.770 | 630 | 35 | 6.3 | comp. ex. |
| 54 | 1.302 | 0.102 | — | — | 1.404 | 2.506 | 0.334 | 0.738 | 635 | 34 | 5.8 | comp. ex. |
| 55 | 1.113 | 1.676 | — | — | 2.789 | 1.891 | 0.550 | 0.656 | 640 | 34 | 8.2 | comp. ex. |
| 56 | 1.325 | 1.893 | — | — | 3.218 | 1.793 | 0.490 | 0.612 | 630 | 35 | 7.9 | comp. ex. |
| 57 | 0.261 | 0.027 | — | — | 0.288 | 4.415 | 0.104 | <u>1.138</u> | 590 | 37 | 4.3 | comp. ex. |
| 58 | 0.325 | 0.035 | — | — | 0.360 | 4.036 | 0.089 | <u>1.039</u> | 600 | 36 | 3.8 | comp. ex. |
| 59 | 7.325 | 0.061 | — | — | 7.386 | 0.590 | 1.755 | 0.732 | 780 | 18 | 21.5 | comp. ex. |
| 60 | 6.801 | 0.063 | — | — | 6.864 | 0.756 | 2.026 | 0.864 | 790 | 15 | 23.6 | comp. ex. |
| 61 | 1.116 | 3.253 | — | — | 4.369 | 3.312 | 0.187 | 0.890 | <u>620</u> | <u>26</u> | 3.8 | comp. ex.* |
| 62 | 1.236 | 3.456 | — | — | 4.692 | 3.016 | 0.159 | 0.807 | <u>625</u> | <u>27</u> | 2.7 | comp. ex.* |
| 63 | 1.337 | 0.014 | — | — | 1.351 | 2.329 | 0.425 | 0.724 | 625 | 36 | 5.5 | comp. ex. |
| 64 | 1.113 | 0.016 | — | — | 1.129 | 2.638 | 0.694 | 0.891 | 631 | 36 | 5.4 | comp. ex. |
| 65 | 0.826 | 0.003 | — | — | 0.829 | 3.345 | 0.863 | <u>1.124</u> | 640 | 35 | 5.5 | comp. ex. |
| 66 | 0.816 | 0.004 | — | — | 0.820 | 3.015 | 0.726 | <u>0.996</u> | 620 | 35 | 6.3 | comp. ex. |
| 67 | 0.861 | 0.012 | — | — | 0.873 | 3.012 | 0.786 | <u>1.015</u> | 630 | 34 | 5.3 | comp. ex. |
| 68 | 1.325 | 0.045 | — | — | 1.370 | 2.756 | 0.426 | 0.831 | 625 | 34 | 3.5 | comp. ex.** |
| 69 | 1.426 | 0.068 | — | — | 1.494 | 2.726 | 0.531 | 0.859 | 610 | 29 | <u>0.6</u> | comp. ex. |
| 70 | 1.324 | 0.016 | — | — | 1.340 | 2.627 | 0.426 | 0.799 | 650 | 26 | <u>1.8</u> | comp. ex. |
| 71 | 1.236 | 0.013 | — | — | 1.249 | 3.456 | 0.597 | 1.063 | 580 | 30 | <u>1.5</u> | comp. ex. |
| 72 | 1.013 | 0.009 | — | — | 1.022 | 3.015 | 0.624 | 0.962 | 630 | 29 | <u>1.2</u> | comp. ex. |
| 73 | 1.106 | 0.012 | — | — | 1.118 | 2.984 | 0.601 | 0.946 | 635 | 28 | <u>1</u> | comp. ex. |
| 74 | 1.068 | 0.010 | — | — | 1.078 | 3.126 | 0.726 | 1.024 | 640 | 26 | <u>0</u> | comp. ex. |
| 75 | 1.215 | 0.015 | — | — | 1.230 | 2.957 | 0.543 | 0.920 | 645 | 27 | <u>1.2</u> | comp. ex. |

TABLE 3-continued

| | Surface layer Ni (%) | Surface layer Cu (%) | Surface layer Co (%) | Surface layer Sn (%) | Ni + Cu + (Co + Sn) (%) | Surface layer Si (%) | Surface layer Al (%) | ¼Si + ⅓Al (%) | TS (MPa) | El (%) | Residual γ (%) | Reference |
|---|---|---|---|---|---|---|---|---|---|---|---|---|
| 76 | 1.456 | 0.025 | — | — | 1.481 | 2.745 | 0.459 | 0.839 | 630 | 25 | <u>0</u> | comp. ex. |
| 77 | 1.235 | 0.014 | — | — | 1.249 | 2.924 | 0.586 | 0.926 | 635 | 26 | <u>0.5</u> | comp. ex. |
| 78 | 1.126 | 0.010 | — | — | 1.136 | 2.957 | 0.624 | 0.947 | 630 | 36 | 5.3 | comp. ex. |
| 79 | 1.198 | 0.011 | — | — | 1.209 | 2.843 | 0.546 | 0.893 | 625 | 25 | <u>0.3</u> | comp. ex. |
| 80 | 1.016 | 0.006 | — | — | 1.022 | 3.146 | 0.657 | 1.006 | 630 | 30 | <u>1.6</u> | comp. ex. |
| 81 | 1.267 | 0.009 | — | — | 1.276 | 2.782 | 0.495 | 0.861 | 620 | 26 | <u>0.8</u> | comp. ex. |
| 82 | 1.395 | 0.023 | — | — | 1.418 | 2.568 | 0.406 | 0.777 | 620 | 26 | <u>0.5</u> | comp. ex. |
| 83 | 1.304 | 0.019 | — | — | 1.323 | 2.654 | 0.416 | 0.802 | 630 | 28 | <u>1.1</u> | comp. ex. |
| 84 | 0.804 | 0.008 | — | — | 0.812 | 3.159 | 0.789 | <u>1.053</u> | 645 | 34 | 5.3 | comp. ex. |
| 85 | 0.812 | 0.009 | — | — | 0.821 | 3.015 | 0.756 | <u>1.006</u> | 622 | 35 | 6.5 | comp. ex. |
| 86 | 0.834 | 0.011 | — | — | 0.845 | 3.214 | 0.658 | <u>1.023</u> | 635 | 33 | 5.5 | comp. ex. |
| 87 | 1.325 | 0.015 | — | — | 1.340 | 2.795 | 0.498 | 0.865 | 620 | 33 | 3.3 | comp. ex.** |
| 88 | 1.426 | 0.016 | — | — | 1.442 | 2.846 | 0.501 | 0.879 | 615 | 28 | <u>0.7</u> | comp. ex. |
| 89 | 1.325 | 0.015 | — | — | 1.340 | 2.783 | 0.504 | 0.864 | 645 | 26 | <u>1.3</u> | comp. ex. |
| 90 | 1.359 | 0.017 | — | — | 1.376 | 3.214 | 0.785 | 1.065 | 575 | 28 | <u>1.6</u> | comp. ex. |
| 91 | 1.015 | 0.010 | — | — | 1.025 | 3.012 | 0.688 | 0.982 | 625 | 27 | <u>1.1</u> | comp. ex. |
| 92 | 1.105 | 0.010 | — | — | 1.115 | 2.986 | 0.657 | 0.966 | 640 | 26 | <u>0.8</u> | comp. ex. |
| 93 | 1.168 | 0.008 | — | — | 1.176 | 2.904 | 0.604 | 0.927 | 635 | 25 | <u>0</u> | comp. ex. |
| 94 | 1.015 | 0.009 | — | — | 1.024 | 2.954 | 0.715 | 0.977 | 640 | 26 | <u>1.1</u> | comp. ex. |
| 95 | 1.235 | 0.015 | — | — | 1.250 | 2.716 | 0.546 | 0.861 | 635 | 26 | <u>0</u> | comp. ex. |
| 96 | 1.015 | 0.010 | — | — | 1.025 | 2.957 | 0.750 | 0.989 | 630 | 25 | <u>0.6</u> | comp. ex. |
| 97 | 1.126 | 0.011 | — | — | 1.137 | 3.015 | 0.657 | 0.973 | 625 | 24 | <u>0.7</u> | comp. ex. |
| 98 | 1.348 | 0.013 | — | — | 1.361 | 2.647 | 0.459 | 0.815 | 635 | 27 | <u>0.9</u> | comp. ex. |

Note:
The underlined values in the tables are those outside of the ranges of the invention.
The "comp. ex.*" references indicate samples with poor strength/ductility balance that did not achieve the object of the invention.
The "comp. ex.**" references indicate samples that had residual oxides due to insufficient acid washing after rolling, and thus had impaired plating adhesion.
The samples with Sn and Co indicated by "—" are those where the steel contained no Sn or Co, and those elements were therefore not measured.

TABLE 4

| | Components in plating layer (%) (remainder: Zn and unavoidable impurities) | | | | | | | | | | | Weldability | Plating property | Plating adhesion | Reference |
|---|---|---|---|---|---|---|---|---|---|---|---|---|---|---|---|
| | Fe | Al | Mn | Pb | Sb | Ni | Cu | Co | Sn | Cd | Cr | | | | |
| 1 | 0.08 | 0.24 | 0.004 | 0.002 | 0.006 | 0.168 | 0.001 | 0.002 | 0.010 | 0.004 | 0.034 | ○ | ⊚ | ⊚ | inv. ex. |
| 2 | 0.06 | 0.64 | 0.009 | 0.003 | 0.006 | 0.340 | 0.003 | 0.002 | 0.000 | 0.003 | 0.025 | ○ | ⊚ | ⊚ | inv. ex. |
| 3 | 0.11 | 0.19 | 0.003 | 0.002 | 0.007 | 0.223 | 0.004 | 0.004 | 0.002 | 0.005 | 0.011 | ○ | ⊚ | ⊚ | inv. ex. |
| 4 | 11.5 | 0.24 | 0.013 | 0.006 | 0.000 | 0.272 | 0.004 | 0.002 | 0.009 | 0.002 | 0.034 | ○ | ⊚ | ⊚ | inv. ex. |
| 5 | 10.8 | 0.26 | 0.007 | 0.008 | 0.003 | 0.222 | 0.005 | 0.011 | 0.008 | 0.003 | 0.039 | ○ | ⊚ | ⊚ | inv. ex. |
| 6 | 9.6 | 0.26 | 0.006 | 0.004 | 0.002 | 0.133 | 0.009 | 0.012 | 0.005 | 0.000 | 0.007 | ○ | ⊚ | ⊚ | inv. ex. |
| 7 | 0.07 | 0.33 | 0.008 | 0.000 | 0.003 | 0.114 | 0.003 | 0.003 | 0.002 | 0.008 | 0.026 | ○ | ⊚ | ⊚ | inv. ex. |
| 8 | 8.6 | 0.28 | 0.015 | 0.006 | 0.007 | 2.017 | 0.175 | 0.003 | 0.009 | 0.003 | 0.013 | ○ | ⊚ | ⊚ | inv. ex. |
| 9 | 9.2 | 0.27 | 0.005 | 0.002 | 0.003 | 0.191 | 0.001 | 0.003 | 0.001 | 0.000 | 0.029 | ○ | ⊚ | ⊚ | inv. ex. |
| 10 | 0.03 | 0.21 | 0.006 | 0.000 | 0.007 | 0.236 | 0.017 | 0.002 | 0.000 | 0.002 | 0.013 | ○ | ⊚ | ⊚ | inv. ex. |
| 11 | 0.05 | 0.22 | 0.001 | 0.003 | 0.005 | 0.045 | 0.046 | 0.011 | 0.007 | 0.001 | 0.017 | ○ | ⊚ | ⊚ | inv. ex. |
| 12 | 10.2 | 0.21 | 0.009 | 0.001 | 0.006 | 0.169 | 0.059 | 0.008 | 0.004 | 0.007 | 0.023 | ○ | ⊚ | ⊚ | inv. ex. |
| 13 | 0.06 | 0.30 | 0.005 | 0.003 | 0.001 | 0.203 | 0.138 | 0.006 | 0.008 | 0.005 | 0.015 | ○ | ⊚ | ⊚ | inv. ex. |
| 14 | 9.6 | 0.32 | 0.005 | 0.002 | 0.006 | 1.569 | 0.637 | 0.013 | 0.035 | 0.007 | 0.036 | ○ | ⊚ | ⊚ | inv. ex. |
| 15 | 10.2 | 0.30 | 0.003 | 0.006 | 0.002 | 2.273 | 0.659 | 0.008 | 0.005 | 0.004 | 0.018 | ○ | ⊚ | ⊚ | inv. ex. |
| 16 | 0.05 | 0.26 | 0.001 | 0.004 | 0.003 | 1.912 | 0.878 | 0.003 | 0.010 | 0.008 | 0.037 | ○ | ⊚ | ⊚ | inv. ex. |
| 17 | 10.1 | 0.34 | 0.007 | 0.008 | 0.003 | 0.307 | 0.488 | 0.011 | 0.002 | 0.008 | 0.031 | ○ | ⊚ | ⊚ | inv. ex. |
| 18 | 0.09 | 0.26 | 0.011 | 0.007 | 0.007 | 0.064 | 0.254 | 0.001 | 0.002 | 0.001 | 0.001 | ○ | ⊚ | ⊚ | inv. ex. |
| 19 | 11.5 | 0.28 | 0.006 | 0.004 | 0.004 | 0.311 | 0.350 | 0.005 | 0.011 | 0.004 | 0.020 | ○ | ⊚ | ⊚ | inv. ex. |
| 20 | 0.16 | 0.73 | 0.007 | 0.006 | 0.008 | 0.607 | 0.193 | 0.001 | 0.003 | 0.005 | 0.026 | ○ | ⊚ | ⊚ | inv. ex. |
| 21 | 8.6 | 0.19 | 0.016 | 0.004 | 0.005 | 0.512 | 0.260 | 0.007 | 0.006 | 0.005 | 0.020 | ○ | ⊚ | ⊚ | inv. ex. |
| 22 | 11.3 | 0.30 | 0.005 | 0.006 | 0.002 | 0.159 | 0.008 | 0.012 | 0.004 | 0.005 | 0.002 | ○ | ○ | ○ | inv. ex. |
| 23 | 10.5 | 0.24 | 0.017 | 0.006 | 0.003 | 0.820 | 0.826 | 0.006 | 0.010 | 0.004 | 0.000 | ○ | ⊚ | ⊚ | inv. ex. |
| 24 | 0.03 | 0.21 | 0.006 | 0.006 | 0.006 | 0.378 | 0.035 | 0.007 | 0.003 | 0.007 | 0.021 | ○ | ⊚ | ⊚ | inv. ex. |
| 25 | 0.05 | 0.23 | 0.007 | 0.004 | 0.004 | 2.835 | 0.009 | 0.005 | 0.001 | 0.006 | 0.008 | ○ | ⊚ | ⊚ | inv. ex. |
| 26 | 9.8 | 0.26 | 0.011 | 0.007 | 0.002 | 0.314 | 0.907 | 0.006 | 0.010 | 0.007 | 0.033 | ○ | ⊚ | ⊚ | inv. ex. |
| 27 | 0.11 | 0.30 | 0.008 | 0.006 | 0.001 | 2.070 | 0.208 | 0.005 | 0.015 | 0.004 | 0.025 | ○ | ⊚ | ⊚ | inv. ex. |
| 28 | 10.2 | 0.29 | 0.001 | 0.001 | 0.004 | 1.924 | 0.266 | 0.009 | 0.010 | 0.003 | 0.022 | ○ | ⊚ | ⊚ | inv. ex. |
| 29 | 8.6 | 0.27 | 0.009 | 0.004 | 0.006 | 0.963 | 0.167 | 0.011 | 0.006 | 0.006 | 0.037 | ○ | ⊚ | ⊚ | inv. ex. |
| 30 | 11.3 | 0.34 | 0.005 | 0.006 | 0.003 | 0.582 | 0.054 | 0.003 | 0.000 | 0.004 | 0.002 | ○ | ⊚ | ⊚ | inv. ex. |
| 31 | 0.04 | 0.20 | 0.011 | 0.000 | 0.002 | 0.412 | 0.107 | 0.011 | 0.003 | 0.001 | 0.015 | ○ | ⊚ | ⊚ | inv. ex. |
| 32 | 9.8 | 0.18 | 0.009 | 0.005 | 0.005 | 1.437 | 0.216 | 0.010 | 0.004 | 0.004 | 0.021 | ○ | ⊚ | ⊚ | inv. ex. |
| 33 | 8.6 | 0.31 | 0.001 | 0.003 | 0.004 | 0.143 | 0.044 | 0.011 | 0.010 | 0.001 | 0.035 | ○ | ⊚ | ⊚ | comp. ex. |
| 34 | 0.13 | 0.26 | 0.006 | 0.002 | 0.004 | 0.015 | 0.116 | 0.002 | 0.005 | 0.006 | 0.015 | ○ | ⊚ | ⊚ | comp. ex. |
| 35 | 10.8 | 0.19 | 0.007 | 0.000 | 0.008 | 0.179 | 0.003 | 0.003 | 0.001 | 0.002 | 0.034 | · | ○ | ○ | comp. ex. |

TABLE 4-continued

| | Components in plating layer (%) (remainder: Zn and unavoidable impurities) | | | | | | | | | | | Weldability | Plating property | Plating adhesion | Reference |
|---|---|---|---|---|---|---|---|---|---|---|---|---|---|---|---|
| | Fe | Al | Mn | Pb | Sb | Ni | Cu | Co | Sn | Cd | Cr | | | | |
| 36 | 0.06 | 0.28 | 0.017 | 0.006 | 0.000 | 0.026 | 0.011 | 0.011 | 0.003 | 0.000 | 0.007 | · | ○ | ○ | comp. ex. |
| 37 | 12.3 | 0.27 | 0.007 | 0.000 | 0.007 | 0.154 | 0.376 | 0.000 | 0.004 | 0.008 | 0.012 | ○ | ⊚ | ⊚ | comp. ex. |
| 38 | 0.01 | 0.31 | 0.015 | 0.001 | 0.002 | 0.013 | 0.091 | 0.006 | 0.003 | 0.000 | 0.003 | ○ | ⊚ | ⊚ | comp. ex. |
| 39 | 10.5 | 0.34 | 0.009 | 0.007 | 0.004 | 0.692 | 0.738 | 0.007 | 0.012 | 0.001 | 0.007 | ○ | · | · | comp. ex. |
| 40 | 0.11 | 0.28 | 0.002 | 0.005 | 0.003 | 1.716 | 0.658 | 0.007 | 0.010 | 0.007 | 0.022 | ○ | · | · | comp. ex. |
| 41 | 8.6 | 0.28 | 0.006 | 0.004 | 0.007 | 0.242 | 0.382 | 0.006 | 0.011 | 0.000 | 0.039 | ○ | ⊚ | ⊚ | comp. ex. |
| 42 | 0.1 | 0.29 | 0.017 | 0.004 | 0.003 | 0.125 | 0.754 | 0.006 | 0.003 | 0.000 | 0.038 | ○ | ⊚ | ⊚ | comp. ex. |
| 43 | 11.3 | 0.35 | 0.011 | 0.007 | 0.008 | 1.013 | 0.197 | 0.004 | 0.009 | 0.004 | 0.011 | ○ | · | · | comp. ex. |
| 44 | 0.06 | 0.20 | 0.006 | 0.002 | 0.006 | 0.134 | 0.002 | 0.005 | 0.008 | 0.001 | 0.022 | ○ | · | · | comp. ex. |
| 45 | 13.3 | 0.24 | 0.011 | 0.005 | 0.007 | 0.008 | 0.718 | 0.012 | 0.012 | 0.008 | 0.029 | ○ | ⊚ | ⊚ | comp. ex. |
| 46 | 0.05 | 0.21 | 0.000 | 0.007 | 0.005 | 0.015 | 0.089 | 0.008 | 0.009 | 0.008 | 0.003 | ○ | ⊚ | ⊚ | comp. ex. |
| 47 | 8.9 | 0.84 | 0.009 | 0.003 | 0.008 | 1.118 | 0.237 | 0.003 | 0.005 | 0.001 | 0.033 | ○ | · | · | comp. ex. |
| 48 | 0.1 | 0.23 | 0.010 | 0.002 | 0.006 | 0.626 | 0.029 | 0.002 | 0.005 | 0.007 | 0.038 | ○ | · | · | comp. ex. |
| 49 | 11.3 | 0.20 | 0.001 | 0.006 | 0.007 | 0.428 | 0.034 | 0.004 | 0.007 | 0.001 | 0.022 | ○ | ⊚ | ⊚ | comp. ex. |
| 50 | 0.01 | 0.26 | 0.003 | 0.007 | 0.007 | 0.865 | 0.045 | 0.010 | 0.007 | 0.005 | 0.004 | ○ | ⊚ | ⊚ | comp. ex. |
| 51 | 10.5 | 0.20 | 0.007 | 0.004 | 0.003 | 0.151 | 0.065 | 0.007 | 0.006 | 0.002 | 0.012 | Δ | ⊚ | ⊚ | comp. ex. |
| 52 | 0.04 | 0.20 | 0.009 | 0.006 | 0.001 | 0.025 | 0.181 | 0.000 | 0.008 | 0.005 | 0.017 | Δ | ⊚ | ⊚ | comp. ex. |
| 53 | 12.2 | 0.30 | 0.018 | 0.008 | 0.001 | 0.168 | 0.016 | 0.005 | 0.002 | 0.002 | 0.011 | Δ | ⊚ | ⊚ | comp. ex. |
| 54 | 0.07 | 0.22 | 0.013 | 0.000 | 0.005 | 0.171 | 0.002 | 0.002 | 0.004 | 0.001 | 0.016 | Δ | ⊚ | ⊚ | comp. ex. |
| 55 | 10.8 | 0.26 | 0.013 | 0.006 | 0.002 | 0.283 | 0.452 | 0.009 | 0.005 | 0.002 | 0.004 | · | ⊚ | ⊚ | comp. ex. |
| 56 | 0.06 | 0.35 | 0.016 | 0.001 | 0.002 | 0.090 | 0.432 | 0.004 | 0.009 | 0.002 | 0.032 | · | ⊚ | ⊚ | comp. ex. |
| 57 | 13.5 | 0.23 | 0.012 | 0.004 | 0.005 | 0.047 | 0.002 | 0.011 | 0.007 | 0.005 | 0.037 | ○ | · | · | comp. ex. |
| 58 | 0.14 | 0.27 | 0.012 | 0.004 | 0.001 | 0.052 | 0.001 | 0.001 | 0.008 | 0.006 | 0.036 | ○ | · | · | comp. ex. |
| 59 | 10.3 | 0.27 | 0.001 | 0.004 | 0.001 | 0.237 | 0.015 | 0.009 | 0.009 | 0.005 | 0.039 | ○ | ⊚ | ⊚ | comp. ex. |
| 60 | 0.04 | 0.28 | 0.016 | 0.006 | 0.002 | 0.479 | 0.007 | 0.010 | 0.005 | 0.001 | 0.038 | ○ | ⊚ | ⊚ | comp. ex. |
| 61 | 10.5 | 0.27 | 0.015 | 0.004 | 0.006 | 0.239 | 0.595 | 0.009 | 0.001 | 0.003 | 0.011 | ○ | ⊚ | ⊚ | comp. ex.* |
| 62 | 0.12 | 0.30 | 0.002 | 0.001 | 0.004 | 0.297 | 0.385 | 0.011 | 0.002 | 0.005 | 0.021 | ○ | ⊚ | ⊚ | comp. ex.* |
| 63 | 0.08 | 1.35 | 0.004 | 0.002 | 0.006 | 0.168 | 0.001 | 0.002 | 0.010 | 0.004 | 0.034 | ○ | ⊚ | ⊚ | comp. ex. |
| 64 | 11.5 | 1.26 | 0.013 | 0.006 | 0.000 | 0.272 | 0.004 | 0.002 | 0.009 | 0.002 | 0.034 | ○ | ⊚ | ⊚ | comp. ex. |
| 65 | 9.2 | 0.32 | 0.009 | 0.005 | 0.001 | 0.013 | 0.000 | 0.005 | 0.008 | 0.003 | 0.003 | ○ | · | · | comp. ex. |
| 66 | 13.5 | 0.19 | 0.012 | 0.001 | 0.006 | 0.196 | 0.000 | 0.005 | 0.004 | 0.004 | 0.036 | ○ | · | · | comp. ex. |
| 67 | 10.5 | 0.30 | 0.000 | 0.006 | 0.006 | 0.065 | 0.001 | 0.002 | 0.000 | 0.005 | 0.008 | ○ | · | · | comp. ex. |
| 68 | 9.6 | 0.33 | 0.003 | 0.003 | 0.001 | 0.316 | 0.000 | 0.010 | 0.008 | 0.001 | 0.032 | ○ | Δ | Δ | comp. ex.** |
| 69 | 12.2 | 0.19 | 0.008 | 0.003 | 0.006 | 0.324 | 0.015 | 0.012 | 0.003 | 0.003 | 0.026 | ○ | ⊚ | ⊚ | comp. ex. |
| 70 | 10.5 | 0.20 | 0.003 | 0.004 | 0.005 | 0.261 | 0.001 | 0.009 | 0.004 | 0.003 | 0.029 | ○ | ⊚ | ⊚ | comp. ex. |
| 71 | 9.1 | 0.20 | 0.004 | 0.000 | 0.002 | 0.205 | 0.004 | 0.004 | 0.012 | 0.006 | 0.028 | ○ | ○ | ○ | comp. ex. |
| 72 | 10.1 | 0.26 | 0.018 | 0.004 | 0.007 | 0.282 | 0.001 | 0.009 | 0.006 | 0.002 | 0.031 | ○ | ○ | ○ | comp. ex. |
| 73 | 13.2 | 0.30 | 0.004 | 0.003 | 0.008 | 0.084 | 0.002 | 0.008 | 0.000 | 0.002 | 0.005 | ○ | ⊚ | ⊚ | comp. ex. |
| 74 | 8.34 | 0.93 | 0.015 | 0.005 | 0.006 | 0.077 | 0.001 | 0.011 | 0.002 | 0.003 | 0.005 | ○ | ○ | ○ | comp. ex. |
| 75 | 12.5 | 0.32 | 0.004 | 0.005 | 0.003 | 0.243 | 0.001 | 0.003 | 0.008 | 0.005 | 0.022 | ○ | ⊚ | ⊚ | comp. ex. |
| 76 | 10.3 | 0.18 | 0.012 | 0.006 | 0.004 | 0.355 | 0.002 | 0.004 | 0.011 | 0.001 | 0.009 | ○ | ⊚ | ⊚ | comp. ex. |
| 77 | 12.1 | 0.25 | 0.014 | 0.001 | 0.001 | 0.339 | 0.003 | 0.007 | 0.001 | 0.007 | 0.008 | ○ | ⊚ | ⊚ | comp. ex. |
| 78 | <u>5.3</u> | 0.33 | 0.005 | 0.006 | 0.007 | 0.197 | 0.000 | 0.012 | 0.011 | 0.007 | 0.000 | ○ | ○ | ○ | comp. ex. |
| 79 | <u>16.5</u> | 0.33 | 0.011 | 0.005 | 0.004 | 0.052 | 0.000 | 0.000 | 0.008 | 0.004 | 0.032 | ○ | ⊚ | ⊚ | comp. ex. |
| 80 | <u>5.1</u> | 0.24 | 0.008 | 0.004 | 0.007 | 0.183 | 0.000 | 0.007 | 0.009 | 0.002 | 0.013 | ○ | ○ | ○ | comp. ex. |
| 81 | <u>15.6</u> | 0.28 | 0.012 | 0.006 | 0.004 | 0.042 | 0.001 | 0.009 | 0.008 | 0.003 | 0.006 | ○ | ⊚ | ⊚ | comp. ex. |
| 82 | 9.8 | 0.30 | 0.008 | 0.007 | 0.003 | 0.165 | 0.005 | 0.003 | 0.008 | 0.005 | 0.029 | ○ | ⊚ | ⊚ | comp. ex. |
| 83 | 10.5 | 0.30 | 0.013 | 0.004 | 0.005 | 0.269 | 0.004 | 0.001 | 0.005 | 0.004 | 0.032 | ○ | ⊚ | ⊚ | comp. ex. |
| 84 | 0.04 | 0.34 | 0.015 | 0.000 | 0.008 | 0.106 | 0.001 | 0.000 | 0.003 | 0.008 | 0.000 | ○ | · | · | comp. ex. |
| 85 | 0.16 | 0.25 | 0.012 | 0.007 | 0.004 | 0.218 | 0.002 | 0.001 | 0.011 | 0.005 | 0.001 | ○ | · | · | comp. ex. |
| 86 | 0.04 | 0.20 | 0.004 | 0.006 | 0.006 | 0.052 | 0.002 | 0.004 | 0.005 | 0.006 | 0.028 | ○ | · | · | comp. ex. |
| 87 | 0.07 | 0.30 | 0.014 | 0.007 | 0.002 | 0.380 | 0.001 | 0.000 | 0.006 | 0.004 | 0.013 | ○ | Δ | Δ | comp. ex.** |
| 88 | 0.1 | 0.23 | 0.011 | 0.004 | 0.007 | 0.353 | 0.000 | 0.002 | 0.009 | 0.008 | 0.026 | ○ | ⊚ | ⊚ | comp. ex. |
| 89 | 0.13 | 0.29 | 0.009 | 0.008 | 0.006 | 0.394 | 0.001 | 0.006 | 0.007 | 0.004 | 0.016 | ○ | ⊚ | ⊚ | comp. ex. |
| 90 | 0.16 | 0.32 | 0.017 | 0.006 | 0.007 | 0.331 | 0.001 | 0.011 | 0.001 | 0.006 | 0.017 | ○ | ⊚ | ⊚ | comp. ex. |
| 91 | 0.16 | 0.64 | 0.014 | 0.007 | 0.002 | 0.300 | 0.001 | 0.009 | 0.008 | 0.000 | 0.019 | ○ | ○ | ○ | comp. ex. |
| 92 | 0.04 | 0.27 | 0.008 | 0.002 | 0.001 | 0.117 | 0.002 | 0.007 | 0.005 | 0.000 | 0.024 | ○ | ⊚ | ⊚ | comp. ex. |
| 93 | 0.16 | 0.22 | 0.008 | 0.003 | 0.007 | 0.242 | 0.002 | 0.011 | 0.004 | 0.007 | 0.002 | ○ | ⊚ | ⊚ | comp. ex. |
| 94 | 0.06 | 0.25 | 0.005 | 0.004 | 0.002 | 0.028 | 0.000 | 0.005 | 0.002 | 0.000 | 0.003 | ○ | ○ | ○ | comp. ex. |
| 95 | 0.13 | 0.22 | 0.015 | 0.004 | 0.001 | 0.264 | 0.003 | 0.012 | 0.007 | 0.001 | 0.005 | ○ | ⊚ | ⊚ | comp. ex. |
| 96 | 0.09 | 0.30 | 0.007 | 0.007 | 0.004 | 0.168 | 0.001 | 0.005 | 0.011 | 0.002 | 0.014 | ○ | ○ | ○ | comp. ex. |
| 97 | 0.11 | 0.31 | 0.010 | 0.001 | 0.003 | 0.307 | 0.003 | 0.011 | 0.007 | 0.008 | 0.001 | ○ | ⊚ | ⊚ | comp. ex. |
| 98 | 0.01 | 0.30 | 0.005 | 0.003 | 0.005 | 0.292 | 0.002 | 0.009 | 0.005 | 0.002 | 0.017 | ○ | ⊚ | ⊚ | comp. ex. |

Note:
The underlined values in the tables are those outside of the ranges of the invention.
The "comp. ex.*" references indicate samples with poor strength/ductility balance that did not achieve the object of the invention.
The "comp. ex.**" references indicate samples that had residual oxides due to insufficient acid washing after rolling, and thus had impaired plating adhesion.
The samples with Sn and Co indicated by "—" are those where the steel contained no Sn or Co, and those elements were therefore not measured.

INDUSTRIAL APPLICABILITY

As explained above, according to the present invention there are provided high strength hot-dip galvanized and galvannealed steel sheets with satisfactory press formability and plating adhesion, as well as a process for efficient manufacture of the steel sheets.

What is claimed is:

1. A high strength hot-dip galvanized steel sheet with excellent plating adhesion and press formability, the steel sheet containing in terms of weight percent, C: 0.05–0.2%,
Si: 0.2–2.0%,
Mn: 0.2–2.5%,
Al: 0.01–1.5%,
Ni: 0.2–5.0%,
P: <0.03% and
S: <0.02% where the relationship between Si and Al is such that $0.4(\%) \leq Si(\%)+0.8 Al(\%) \leq 2.0\%$ and the remainder consists of Fe and unavoidable impurities, characterized in that the volume percentage of the retained austenite in the steel sheet is 2–20% and the steel sheet surface wherein the relationship between the Ni and Si, Al in 0.5 μm of the steel sheet surface layer is such that $Ni(\%) \geq \frac{1}{4} Si(\%)+\frac{1}{3} Al(\%)$, has a Zn plating layer comprising Al: $\leq 1\%$ with the remainder Zn and unavoidable impurities.

2. A high strength hot-dip galvanized steel sheet with excellent plating adhesion and press formability, characterized by also containing, in addition to the steel sheet components mentioned in claim 1 in terms of weight percent, Cu at less than 2.0%, wherein the volume percentage of the retained austenite in the steel sheet is 2–20%, and the relationship between the Ni, Cu and Si, Al in 0.5 μm of the steel sheet surface layer is such that $Ni(\%)+Cu(\%) \geq \frac{1}{4} Si(\%)+\frac{1}{3} Al(\%)$.

3. A high strength hot-dip galvanized steel sheet with excellent plating adhesion and press formability, characterized by also containing, in addition to the steel sheet components mentioned in claim 2, in terms of weight percent, B at 0.0002–0.01%, wherein the relationship of Cu and B is such that $B(\%) \times Cu(\%) \geq 0.00005(\%^2)$.

4. A high strength hot-dip galvanized steel sheet with excellent plating adhesion and press formability, characterized by also containing, in addition to the steel sheet components mentioned in claim 2, in terms of weight percent, at least one from among Co at <0.3% and Sn at <0.3%, wherein the volume percentage of the retained austenite in the steel sheet is 2–20% and the relationship between the Ni, Cu, Co, Sn and Si, Al in 0.5 μm of the steel sheet surface layer is such that $Ni(\%)+Cu(\%)+Co(\%)+Sn(\%) > \frac{1}{4} Si(\%)+\frac{1}{3} Al(\%)$.

5. A high strength hot-dip galvanized steel sheet with excellent plating adhesion and press formability, characterized by also containing in addition to the steel sheet components mentioned in claim 1, at least one from among Mo: <0.5%, Cr: <1%, V: <0.3%, Ti: <0.06%, Nb: <0.06%, REM: <0.05%, Ca: <0.05%, Zr: <0.05%, Mg: <0.05%, Zn: <0.02%, W: <0.05%, As: <0.02%, N: <0.03% and O: <0.05%.

6. A high strength hot-dip galvanized steel sheet with excellent plating adhesion and press formability, characterized in that the steel sheet surface of claim 1 has a Zn plating layer containing at least one from among Al: $\leq 1\%$, Mn: <0.02%, Pb: <0.01%, Fe: <0.2%, Sb: <0.01%, Ni: <3.0%, Cu: <1.5%, Sn: <0.1%, Co: <0.1%, Cd: <0.01% and Cr: <0.05%, with the remainder Zn and unavoidable impurities.

7. A high strength alloyed hot-dip galvannealed steel sheet with excellent press formability, characterized in that a steel sheet containing in terms of weight percent, C: 0.05–0.2%,
Si: 0.2–2.0%,
Mn: 0.2–2.5%
Al: 0.01–1.5%,
Ni: 0.2–5.0%.
P: <0.03% and
S: <0.02%, where the relationship between Si and Al is such that $0.4(\%) \leq Si(\%)+0.8 Al(\%) \leq 2.0\%$, the remainder consists of Fe and unavoidable impurities, the volume percentage of the retained austenite in the steel sheet is 2–20% and the relationship between the Ni and Si, Al in 0.5 μm of the steel sheet surface layer is such that $Ni(\%) \geq \frac{1}{4} Si(\%)+\frac{1}{3} Al(\%)$, has a Zn alloy plating layer comprising Fe: 8–15%, Al: $\leq 1\%$ with the remainder Zn and unavoidable impurities.

8. A high strength hot-dip galvannealed steel sheet with excellent press formability, characterized in that a steel sheet also containing, in addition to the steel sheet components mentioned in claim 7, in terms of weight percent, Cu at less than 2.0% with the remainder Fe and unavoidable impurities, wherein the volume percentage of the retained austenite in said steel sheet is 2–20%, and the relationship between the Ni, Cu and Si, Al in 0.5 μm of the steel sheet surface layer is such that $Ni(\%)+Cu(\%) \geq \frac{1}{4} Si(\%)+\frac{1}{3} Al(\%)$, has a Zn alloy plating layer comprising Fe at 8–15% and Al at $\leq 1\%$ with the remainder Zn and unavoidable impurities.

9. A high strength hot-dip galvannealed steel sheet with excellent press formability, characterized in that a steel sheet also containing, in addition to the steel sheet components mentioned in claim 8, in terms of weight percent, B at 0.0002–0.01% where the relationship between Cu and B is such that $B(\%) \times Cu(\%) \geq 0.00005(\%^2)$ with the remainder Fe and unavoidable impurities, has a Zn alloy plating layer comprising Fe at 8–15% and Al at $\leq 1\%$ with the remainder Zn and unavoidable impurities.

10. A high strength hot-dip galvannealed steel sheet with excellent press formability, characterized in that a steel sheet containing, in addition to the steel sheet components mentioned claim 8, in terms of weight percent, at least one from among Co at <0.3% and Sn at $\leq 0.3\%$ with the remainder Fe and unavoidable impurities, wherein the volume percentage of the retained austenite in said steel sheet is 2–20% and the relationship between the Ni, Cu, Co, Sn and Si, Al in 0.5 μm of the steel sheet surface layer is such that $Ni(\%)+Cu(\%)+Co(\%)+Sn(\%) \geq \frac{1}{4} Si(\%)+\frac{1}{3} Al(\%)$, has a Zn alloy plating layer comprising Fe at 8–15% and Al at $\leq 1\%$ with the remainder Zn and unavoidable impurities.

11. A high strength hot-dip galvannealed steel sheet with excellent press formability, characterized by also containing, in addition to the steel sheet components mentioned in claim 7, at least one from among Mo: <0.5%, Cr: <1%, V: <0.3%, Ti: <0.06%, Nb: <0.06%, REM: <0.05%, Ca: <0.05%, Zr: <0.05%, Mg: <0.05%, Zn: <0.02%, W: <0.05%, As: <0.02%, N: <0.03% and O: <0.05%.

12. A high strength hot-dip galvannealed steel sheet with excellent plating adhesion and press formability, characterized in that the steel sheet surface of claim 7 has a Zn plating layer containing at least one from among Fe: 8–15%, Al: $\leq 1\%$, Mn: <0.02%, Pb: <0.01%, Sb: <0.01%, Ni: <3.0%, Cu: <1.5%, Sn: <0.1%, Co: <0.1%, Cd: <0.01% and Cr: <0.05%, with the remainder Zn and unavoidable impurities.

13. A process for the manufacture of a high strength hot-dip galvanized steel sheet with excellent plating adhesion and press formability characterized by having 2–20% retained austenite and a Zn plating layer comprising Al at $\leq 1\%$ with the remainder Zn and unavoidable impurities, whereby a steel sheet having the component composition of claim 1 is cast and solidified and then heated at 1150° C. or higher for at least 45 minutes, after which it is subjected to hot rolling and coiling at 400–780° C., and then after descaling treatment is subjected to cold rolling at a reduction ratio of 35–85%, subsequently annealed from 10 seconds to 6 minutes in the two-phase temperature range of 650–900° C., and finally cooled to 350–500° C. at a cooling rate of 2–200° C./s, subjected to hot-dip galvanizing and then cooled to below 250° C. at a cooling rate of at least 5° C./s.

14. A process for the manufacture of a high strength hot-dip galvannealed steel sheet with excellent press formability characterized by having 2–20% retained austenite and a Zn alloy plating layer comprising Fe at 8–15% and Al at ≦1% with the remainder Zn and unavoidable impurities, whereby a steel sheet having the component composition of claim 7 is cast and solidified and then heated at 1150° C. or higher for at least 45 minutes, after which it is subjected to hot rolling and coiling at 400–780° C., and then after descaling treatment is subjected to cold rolling at a reduction ratio of 35–85%, subsequently annealed from 10 seconds to 6 minutes in the two-phase temperature range of 650–900° C., and finally cooled to 350–500° C. at a cooling rate of 2–200° C./s, subjected to hot-dip galvanizing, and then held in a temperature range of 450–600° C. for 5 seconds to 1 minute prior to cooling to below 250° C. at a cooling rate of at least 5° C./s.

15. A process for the manufacture of a high strength hot-dip galvannealed steel sheet with excellent press formability according to claim 14, characterized in that said cold rolling is followed by annealing from 10 seconds to 6 minutes in the two-phase temperature range of 650–900° C. then by cooling to 350–500° C. at a cooling rate of 2–200° C./s and held in that temperature range for no more than 5 minutes.

* * * * *